(12) United States Patent
Obasih et al.

(10) Patent No.: US 9,559,393 B2
(45) Date of Patent: Jan. 31, 2017

(54) BATTERY MODULE THERMAL MANAGEMENT FLUID GUIDE ASSEMBLY

(71) Applicant: Johnson Controls Technology Company, Holland, MI (US)

(72) Inventors: Kem M. Obasih, Brookfield, WI (US); Gary P. Houchin-Miller, Milwaukee, WI (US); Jonathan P. Lobert, Hartford, WI (US); Alex Shi, Shanghai (CN)

(73) Assignee: Johnson Controls Technology Company, Holland, MI (US)

( * ) Notice: Subject to any disclaimer, the term of this patent is extended or adjusted under 35 U.S.C. 154(b) by 102 days.

(21) Appl. No.: 14/503,101

(22) Filed: Sep. 30, 2014

(65) Prior Publication Data

US 2016/0093929 A1 Mar. 31, 2016

(51) Int. Cl.
*H01M 10/6563* (2014.01)
*H01M 10/613* (2014.01)
(Continued)

(52) U.S. Cl.
CPC ....... *H01M 10/5067* (2013.01); *H01M 2/1077* (2013.01); *H01M 10/0525* (2013.01); *H01M 10/5004* (2013.01); *H01M 10/5016* (2013.01); *H01M 10/5032* (2013.01); *H01M 10/5046* (2013.01); *H01M 10/5053* (2013.01); *H01M 10/5057* (2013.01); *H01M 10/613* (2015.04); *H01M 10/647* (2015.04);
(Continued)

(58) Field of Classification Search
CPC .............. H01M 10/613; H01M 10/625; H01M 10/6563; H01M 2/1077; H01M 10/6566; H01M 10/647
See application file for complete search history.

(56) References Cited

U.S. PATENT DOCUMENTS 5,585,204 A 12/1996 Oshida et al.
6,188,574 B1 2/2001 Anazawa
(Continued)

FOREIGN PATENT DOCUMENTS

EP 1583170 A2 10/2005
EP 1979961 A1 10/2008
(Continued)

OTHER PUBLICATIONS

PCT/US2015/035759 International Search Report and Written Opinion dated Sep. 22, 2015.

*Primary Examiner* — Stewart Fraser
(74) *Attorney, Agent, or Firm* — Fletcher Yoder P.C.

(57) ABSTRACT

The present disclosure includes a battery module with a housing having first and second ends and first and second lateral sides between the first and second ends. The battery module includes prismatic electrochemical cells and a cooling duct having first and second segments. A first body of the first segment extends along the first lateral side of the housing and includes a first opening to environment. A second body of the second segment extends along the second lateral side of the housing and includes a second opening to the environment. The first and second openings are proximate to the second end of the housing. The battery module includes a fan disposed on the first end of the housing. The fan is fluidly coupled to the cooling duct and provides airflow through the first and second openings and along the first and second bodies.

22 Claims, 15 Drawing Sheets

(51) Int. Cl.
  *H01M 10/0525* (2010.01)
  *H01M 10/625* (2014.01)
  *H01M 10/647* (2014.01)
  *H01M 10/6556* (2014.01)
  *H01M 10/6554* (2014.01)
  *H01M 10/6551* (2014.01)
  *H01M 2/10* (2006.01)

(52) U.S. Cl.
  CPC ... *H01M 10/6556* (2015.04); *H01M 10/6563* (2015.04); *H01M 2220/20* (2013.01)

(56) References Cited

U.S. PATENT DOCUMENTS

| | | | |
|---|---|---|---|
| 6,468,150 B1 | 10/2002 | Langdon et al. | |
| 6,949,309 B2 | 9/2005 | Moores, Jr. et al. | |
| 7,558,061 B2 | 7/2009 | Franz et al. | |
| 7,560,190 B2 | 7/2009 | Ahn et al. | |
| 7,572,549 B2 | 8/2009 | Wegner | |
| 7,654,351 B2 | 2/2010 | Koike et al. | |
| 7,795,845 B2 | 9/2010 | Cho | |
| 7,968,223 B2 | 6/2011 | Lee et al. | |
| 8,003,245 B2 | 8/2011 | Lee et al. | |
| 8,042,637 B2 | 10/2011 | Nagata et al. | |
| 8,530,069 B2 | 9/2013 | Wood et al. | |
| 8,609,268 B2 | 12/2013 | Fuhr et al. | |
| 8,663,829 B2 | 3/2014 | Koetting et al. | |
| 2003/0211384 A1 | 11/2003 | Hamada et al. | |
| 2006/0093901 A1 | 5/2006 | Lee et al. | |
| 2006/0115721 A1 | 6/2006 | Lee et al. | |
| 2007/0029966 A1 | 2/2007 | Lee et al. | |
| 2008/0003495 A1* | 1/2008 | Shimizu | H01M 2/1077 429/99 |
| 2010/0297486 A1 | 11/2010 | Fujii | |
| 2010/0310918 A1* | 12/2010 | Yun | H01M 10/052 429/120 |
| 2012/0129023 A1 | 5/2012 | Nakahama et al. | |
| 2012/0263988 A1 | 10/2012 | Obasih et al. | |
| 2013/0273829 A1* | 10/2013 | Obasih | H01M 10/5004 454/284 |
| 2014/0014420 A1 | 1/2014 | Nakamura et al. | |
| 2014/0072844 A1* | 3/2014 | Oh | H01M 10/5067 429/71 |
| 2014/0072845 A1* | 3/2014 | Oh | H01M 2/1077 429/71 |
| 2014/0072846 A1* | 3/2014 | Oh | H01M 2/1077 429/71 |

FOREIGN PATENT DOCUMENTS

| | | |
|---|---|---|
| EP | 2065963 B1 | 8/2010 |
| EP | 2720310 A2 | 4/2014 |
| JP | 2012094313 | 5/2012 |

* cited by examiner

BATTERY MODULE THERMAL MANAGEMENT FLUID GUIDE ASSEMBLY

BACKGROUND

The present disclosure relates generally to the field of batteries and battery modules. More specifically, the present disclosure relates to a fluid guide assembly for thermal management of a Lithium-ion (Li-ion) battery modules.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for providing all or a portion of the motive power for the vehicle can be referred to as an xEV, where the term "xEV" is defined herein to include all of the following vehicles, or any variations or combinations thereof, that use electric power for all or a portion of their vehicular motive force. For example, xEVs include electric vehicles (EVs) that utilize electric power for all motive force. As will be appreciated by those skilled in the art, hybrid electric vehicles (HEVs), also considered xEVs, combine an internal combustion engine propulsion system and a battery-powered electric propulsion system, such as 48 Volt (V) or 130V systems. The term HEV may include any variation of a hybrid electric vehicle. For example, full hybrid systems (FHEVs) may provide motive and other electrical power to the vehicle using one or more electric motors, using only an internal combustion engine, or using both. In contrast, mild hybrid systems (MHEVs) disable the internal combustion engine when the vehicle is idling and utilize a battery system to continue powering the air conditioning unit, radio, or other electronics, as well as to restart the engine when propulsion is desired. The mild hybrid system may also apply some level of power assist, during acceleration for example, to supplement the internal combustion engine. Mild hybrids are typically 96V to 130V and recover braking energy through a belt or crank integrated starter generator. Further, a micro-hybrid electric vehicle (mHEV) also uses a "Stop-Start" system similar to the mild hybrids, but the micro-hybrid systems of a mHEV may or may not supply power assist to the internal combustion engine and operates at a voltage below 60V. For the purposes of the present discussion, it should be noted that mHEVs typically do not technically use electric power provided directly to the crankshaft or transmission for any portion of the motive force of the vehicle, but an mHEV may still be considered as an xEV since it does use electric power to supplement a vehicle's power needs when the vehicle is idling with internal combustion engine disabled and recovers braking energy through an integrated starter generator. In addition, a plug-in electric vehicle (PEV) is any vehicle that can be charged from an external source of electricity, such as wall sockets, and the energy stored in the rechargeable battery packs drives or contributes to drive the wheels. PEVs are a subcategory of EVs that include all-electric or battery electric vehicles (BEVs), plug-in hybrid electric vehicles (PHEVs), and electric vehicle conversions of hybrid electric vehicles and conventional internal combustion engine vehicles.

xEVs as described above may provide a number of advantages as compared to more traditional gas-powered vehicles using only internal combustion engines and traditional electrical systems, which are typically 12V systems powered by a lead acid battery. For example, xEVs may produce fewer undesirable emission products and may exhibit greater fuel efficiency as compared to traditional internal combustion vehicles and, in some cases, such xEVs may eliminate the use of gasoline entirely, as is the case of certain types of EVs or PEVs.

As technology continues to evolve, there is a need to provide improved power sources, particularly battery modules, for such vehicles. For example, traditional battery modules are susceptible to heating or overheating, which may negatively affect components of the battery module and electrochemical cells thereof. Further, thermal management features often increase a volume of the battery module without contributing to energy production, thereby reducing an energy density of the battery module.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure includes a battery module with a housing having a first end, a second end, and first and second lateral sides extending between the first and second ends. The battery module also includes prismatic electrochemical cells disposed in the housing and a cooling duct having a first segment and a second segment. A first body of the first segment extends along the first lateral side of the housing and includes a first opening to a surrounding environment, where the first opening of the first body is proximate to the second end of the housing. A second body of the second segment extends along the second lateral side of the housing and includes a second opening to the surrounding environment, where the second opening is proximate to the second end of the housing. Further, the battery module includes a fan disposed on the first end of the housing, where the fan is fluidly coupled to the cooling duct and the fan is configured to generate an airflow through the first and second openings and along the first and second bodies.

The present disclosure also relates to a battery module with a housing having a first end and a second end opposite to the first end. The battery module includes prismatic electrochemical cells disposed in an inside of the housing between the first end and the second end. The battery module also includes a duct having at least two flow paths extending along a length of the housing of the battery module between the first and second ends of the housing. Further, the battery module includes a fan disposed on the first end of the housing, where the fan is configured to draw air through the duct at least from the second end of the housing to the first end of the housing through the duct and to expel the air from the duct.

The present disclosure further relates to a battery module with a housing having a first end, a second end opposite to the first end, and a bottom extending between the first end and the second end. The battery module also include prismatic electrochemical cells disposed in an inside of the housing between the first end and the second end such that base ends of the prismatic electrochemical cells are proximate to the bottom of the housing. Further, the battery module includes a fluid guide assembly extending along the bottom of the housing, where the fluid guide assembly includes a first flow path having a first segment and a second segment fluidly coupled to the first segment proximate to the second end of the housing to form a U-shape, and a second flow path having a third segment and a fourth segment fluidly coupled to the third segment proximate to the second end of the housing to form a U-shape. Further still, the battery module includes a fan disposed on the first end of the housing, where the fan is fluidly coupled to a distal end of the second segment of the first flow path and to a distal end of the fourth segment of the second flow path, and where the first segment of the first flow path and the third segment of the second flow path comprise inlets fluidly coupling the first and third segments of the first and second flow paths, respectively, to a surrounding environment.

DRAWINGS

Various aspects of this disclosure may be better understood upon reading the following detailed description and upon reference to the drawings in which.

DETAILED DESCRIPTION

Figure 1:
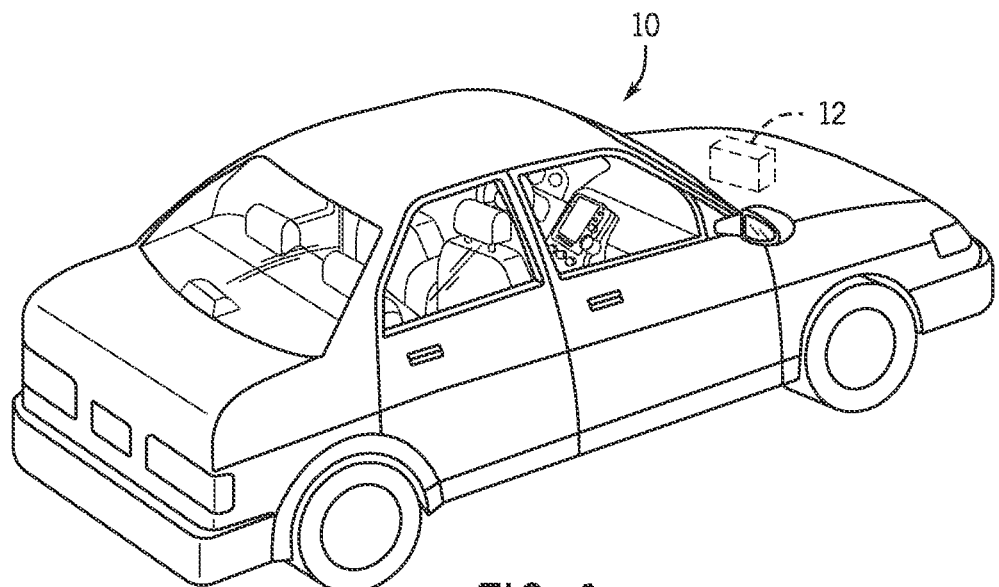
FIG. 1 is a perspective view of a vehicle having a battery system configured in accordance with present embodiments to provide power for various components of the vehicle.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The battery systems described herein may be used to provide power to various types of electric vehicles (xEVs) and other high voltage energy storage/expending applications (e.g., electrical grid power storage systems). Such battery systems may include one or more battery modules, each battery module having a housing and a number of battery cells (e.g., Lithium-ion (Li-ion) electrochemical cells) arranged within the housing to provide particular voltages and/or currents useful to power, for example, one or more components of an xEV. As another example, battery modules in accordance with present embodiments may be incorporated with or provide power to stationary power systems (e.g., non-automotive systems).

Aspects of battery modules in accordance with the present disclosure may increase in temperature during operation. For example, as an electrochemical cell of a battery module generates and/or provides power to the vehicle, the electrochemical cell (and surrounding features of the battery module) may become hot (e.g., relative to the temperature of the same features when the battery module is not operating). It is now recognized that certain features can limit such temperature increases in an efficient manner.

Indeed, battery modules in accordance with the present disclosure include fluid guide assemblies configured to guide a fluid (e.g., air) along various portions of the battery module, a housing of the battery module, or electrochemical cells disposed in the housing of the battery module. For example, the fluid guide assembly may guide air from an inlet disposed in the housing, along sides, bases, and/or terminal ends of the electrochemical cells, and to an outlet disposed in the housing. A device configured to generate the fluid flow (e.g., a fan) may be disposed proximate to the outlet and/or may serve as the outlet. For example, the inlet may be disposed on a first end of the housing and the fan may be disposed on a second end of the housing opposite to the first end, where the fluid flow guide assembly extends between the inlet and the fan. During operation, the fan may generate a pressure drop between an air intake on a first side of the fan (e.g., disposed proximate to the fluid guide assembly) and an environment surrounding the battery module and proximate to a second side of the fan opposite to the first side of the fan. Accordingly, the fan may pull air into the fluid guide assembly through the inlet of the housing, such that the air travels from the inlet, through the fluid guide assembly, through the air intake, and to the surrounding environment.

Depending on the embodiment, the fluid guide assembly may extend through one or more sides of the housing extending between the first and second ends, through an inside of the housing, or through a combination thereof. In general, the fluid guide assembly is positioned proximate to the electrochemical cells disposed on the inside of the housing, such that heat is extracted from the electrochemical cells via the fluid (e.g., air) routed through the fluid guide assembly. Further, one or more cooling plates may be disposed within the fluid guide assembly or proximate to the fluid guide assembly and exposed to the fluid guide assembly. The cooling plates may extract heat from electrochemical cells and direct the heat proximate to the fluid guide assembly, such that the fluid (e.g., air) routed through the fluid guide assembly extracts the heat from the cooling plates. The cooling plates may also include cooling fins configured to extend into, or proximate to, the fluid guide assembly, thereby increasing a surface area of the cooling plate for convective heat exchange between the cooling plate and the fluid (e.g., air) routed through the fluid guide assembly.

To help illustrate, FIG. 1 is a perspective view of an embodiment of a vehicle 10, which may utilize a regenerative braking system. Although the following discussion is presented in relation to vehicles with regenerative braking systems, the techniques described herein are adaptable to other vehicles that capture/store electrical energy with a battery, which may include electric-powered and gas-powered vehicles.

As discussed above, it would be desirable for a battery system 12 to be largely compatible with traditional vehicle designs. Accordingly, the battery system 12 may be placed in a location in the vehicle 10 that would have housed a traditional battery system. For example, as illustrated, the vehicle 10 may include the battery system 12 positioned similarly to a lead-acid battery of a typical combustion-engine vehicle (e.g., under the hood of the vehicle 10). Furthermore, as will be described in more detail below, the battery system 12 may be positioned to facilitate managing temperature of the battery system 12. For example, in some embodiments, positioning a battery system 12 under the hood of the vehicle 10 may enable an air duct to channel airflow over the battery system 12 and cool the battery system 12.

Figure 2:
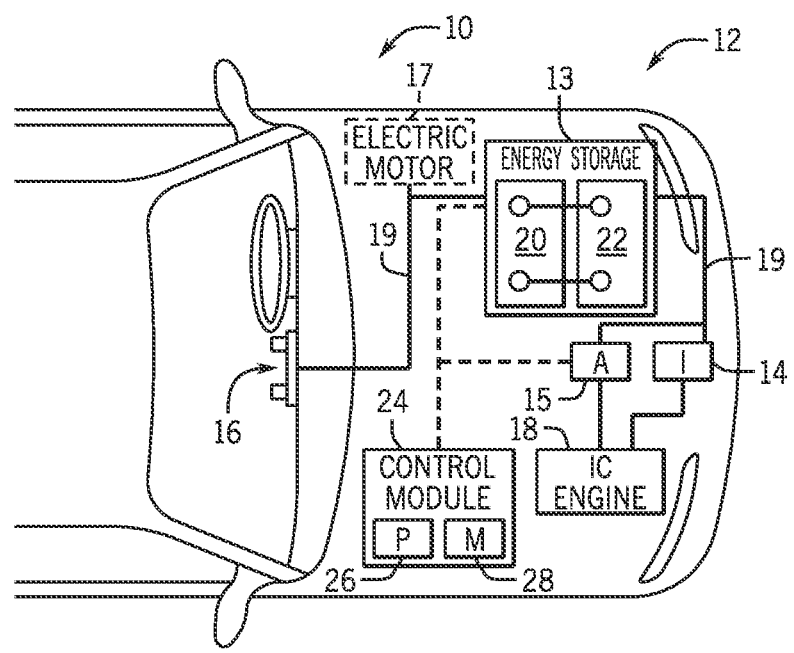
FIG. 2 is a cutaway schematic view of an embodiment of the vehicle and the battery system of FIG. 1.

A more detailed view of the battery system 12 is described in FIG. 2. As depicted, the battery system 12 includes an energy storage component 13 coupled to an ignition system 14, an alternator 15, a vehicle console 16, and optionally to an electric motor 17. Generally, the energy storage component 13 may capture/store electrical energy generated in the vehicle 10 and output electrical energy to power electrical devices in the vehicle 10.

In other words, the battery system 12 may supply power to components of the vehicle's electrical system, which may include radiator cooling fans, climate control systems, electric power steering systems, active suspension systems, auto park systems, electric oil pumps, electric super/turbochargers, electric water pumps, heated windscreen/defrosters, window lift motors, vanity lights, tire pressure monitoring systems, sunroof motor controls, power seats, alarm systems, infotainment systems, navigation features, lane departure warning systems, electric parking brakes, external lights, or any combination thereof. Illustratively, in the depicted embodiment, the energy storage component 13 supplies power to the vehicle console 16 and the ignition system 14, which may be used to start (e.g., crank) the internal combustion engine 18.

Additionally, the energy storage component 13 may capture electrical energy generated by the alternator 15 and/or the electric motor 17. In some embodiments, the alternator 15 may generate electrical energy while the internal combustion engine 18 is running. More specifically, the alternator 15 may convert the mechanical energy produced by the rotation of the internal combustion engine 18 into electrical energy. Additionally or alternatively, when the vehicle 10 includes an electric motor 17, the electric motor 17 may generate electrical energy by converting mechanical energy produced by the movement of the vehicle 10 (e.g., rotation of the wheels) into electrical energy. Thus, in some embodiments, the energy storage component 13 may capture electrical energy generated by the alternator 15 and/or the electric motor 17 during regenerative braking. As such, the alternator 15 and/or the electric motor 17 are generally referred to herein as a regenerative braking system.

To facilitate capturing and supplying electric energy, the energy storage component 13 may be electrically coupled to the vehicle's electric system via a bus 19. For example, the bus 19 may enable the energy storage component 13 to receive electrical energy generated by the alternator 15 and/or the electric motor 17. Additionally, the bus 19 may enable the energy storage component 13 to output electrical energy to the ignition system 14 and/or the vehicle console 16. Accordingly, when a 12 volt battery system 12 is used, the bus 19 may carry electrical power typically between 8-18 volts.

Additionally, as depicted, the energy storage component 13 may include multiple battery modules. For example, in the depicted embodiment, the energy storage component 13 includes a lithium ion (e.g., a first) battery module 20 and a lead-acid (e.g., a second) battery module 22, which each includes one or more battery cells. In other embodiments, the energy storage component 13 may include any number of battery modules. Additionally, although the lithium ion battery module 20 and lead-acid battery module 22 are depicted adjacent to one another, they may be positioned in different areas around the vehicle. For example, the lead-acid battery module 22 may be positioned in or about the interior of the vehicle 10 while the lithium ion battery module 20 may be positioned under the hood of the vehicle 10.

In some embodiments, the energy storage component 13 may include multiple battery modules to utilize multiple different battery chemistries. For example, when the lithium ion battery module 20 is used, performance of the battery system 12 may be improved since the lithium ion battery chemistry generally has a higher coulombic efficiency and/or a higher power charge acceptance rate (e.g., higher maximum charge current or charge voltage) than the lead-acid battery chemistry. As such, the capture, storage, and/or distribution efficiency of the battery system 12 may be improved.

To facilitate controlling the capturing and storing of electrical energy, the battery system 12 may additionally include a control module 24. More specifically, the control module 24 may control operations of components in the battery system 12, such as relays (e.g., switches) within energy storage component 13, the alternator 15, and/or the electric motor 17. For example, the control module 24 may regulate amount of electrical energy captured/supplied by each battery module 20 or 22 (e.g., to de-rate and re-rate the battery system 12), perform load balancing between the battery modules 20 and 22, determine a state of charge of each battery module 20 or 22, determine temperature of each battery module 20 or 22, control voltage output by the alternator 15 and/or the electric motor 17, and the like.

Accordingly, the control unit 24 may include one or more processor 26 and one or more memory 28. More specifically, the one or more processor 26 may include one or more application specific integrated circuits (ASICs), one or more field programmable gate arrays (FPGAs), one or more general purpose processors, or any combination thereof. Additionally, the one or more memory 28 may include volatile memory, such as random access memory (RAM), and/or non-volatile memory, such as read-only memory (ROM), optical drives, hard disc drives, or solid-state drives. In some embodiments, the control unit 24 may include portions of a vehicle control unit (VCU) and/or a separate battery control module.

Figure 3:
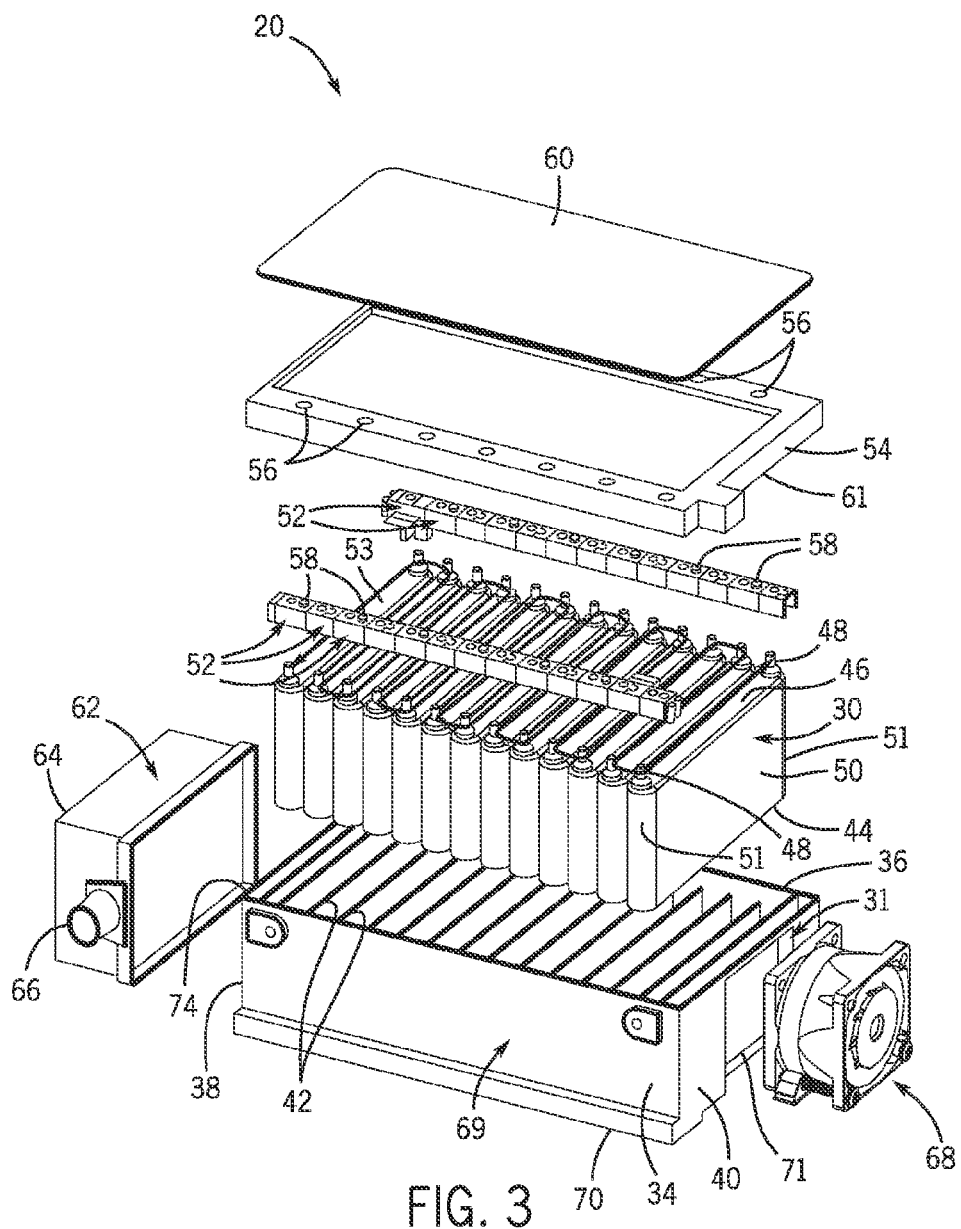
FIG. 3 is an exploded perspective view of an embodiment of a battery module for use in the vehicle of FIG. 1, in accordance with an aspect of the present disclosure.

An exploded perspective view of one embodiment of the lithium-ion (Li-ion) battery module 20, in accordance with the present disclosure, is shown in FIG. 3. In the illustrated embodiment, the battery module 20 includes a number of individual electrochemical cells 30 (e.g., prismatic Li-ion electrochemical cells) housed in a housing 31 of the battery module 20. The illustrated housing 31 includes two lateral sides 34, 36 extending between ends 38, 40 of the housing 31. Partitions 42 extend between the two lateral sides 34, 36, where the partitions 42 define compartments through which the electrochemical cells 30 extend. For example, each electrochemical cell 30 may be received by a corresponding compartment defined by two adjacent partitions 42. In some embodiments, the housing 31 may not include partitions 42. For example, the housing 31 may include an open inside configured to receive electrochemical cells 30 stacked together and inserted into the open inside of the housing 31.

Continuing with the illustrated embodiment, the electrochemical cells 30 each include a base end 44, a terminal end 46 (having terminals 48 extending therefrom), and two broad faces 50 (e.g., broad sides) opposite to one another and extending between the base end 44 and the terminal end 46. The electrochemical cells 30 also include thin or narrow faces 51 (e.g., thin sides, thin faces, narrow sides, intervening faces, intervening sides) extending between the base end 44, the terminal end 46, and the two broad faces 50. It should be noted that, in other embodiments, the narrow faces 51 may not be narrow, and that the narrow faces 51 may actually be curved portions extending between the two broad faces 50. The term "narrow" is intended to differentiate the narrow faces 51 and broad sides 50 in the illustrated embodiment, but, in another embodiment, the sides 50, 51 (e.g., faces) may be sized differently than is shown. In the illustrated embodiment, the electrochemical cells 30 are disposed into the housing 31 such that the faces 50 of adjacent electrochemical cells 30 are disposed proximate to each other, and separated by one of the partitions 42. It should be noted, however, that the housing 31 may not include the partitions 42. For example, all the electrochemical cells 30 may be stacked broad face 50 to broad face 50 in a single row, and the single row may be disposed into the housing 31 (e.g., having no partitions 42). Further, the geometry of the electrochemical cell 30 used for battery modules 20 in accordance with the present disclosure may vary. For example, the electrochemical cells 30 may be cylindrical electrochemical cells, prismatic electrochemical cells, pouch cells, or some other type of cells. The housing 31 may also include a different geometry than is shown in the illustrated embodiment. For example, the housing 31 may be configured (e.g., shaped, sized, oriented) to accommodate electrochemical cells 30 other than those shown in the illustrated embodiment.

As shown, the battery module 20 includes coupling mechanisms 52 for coupling the terminals 48 of adjacent electrochemical cells 30. For example, the coupling mechanisms 52 may couple electrochemical cells 30 in series or in parallel by providing an electrical path between like terminals 48 (e.g., two positive terminals 48) or unalike terminals 48 (e.g., one positive terminal 48 and one negative terminal 48). In some embodiments, some of the electrochemical cells 30 may be coupled in series, and some of the electrochemical cells 30 may be coupled in parallel. In the illustrated embodiment, adjacent electrochemical cells 30 are coupled in series and these couplings are replicated between all of the terminals 48 of all of the electrochemical cells 30 in the battery module 20. In this manner, the terminals 48 represent electrical contacts to an aggregated network of connections between all of the electrochemical cells 30. In other words, the aggregated network of connections zig-zags through the electrochemical cells 30, as shown by arrow 53. Lead terminals (or lead coupling mechanisms) on either end of the row of electrochemical cells 30 may be coupled to busses that couple the battery module 20 to a load (not shown), thereby providing a charge to the load.

In accordance with the present disclosure, the coupling mechanisms 52 between adjacent terminals 48 may vary depending on the embodiment. In some embodiments, bus bars may be used to couple two adjacent terminals 48 of two adjacent electrochemical cells 30 in series or parallel. In other embodiments, the electrochemical cells 30 may include flanged terminals 48 configured to directly couple to adjacent flanged terminals. In still other embodiments, the coupling mechanism 52 may include an assembly of various parts (e.g., adapters and bus bars) configured to transition an electrical path between the terminals 48 from one material to another. In the illustrated embodiment, each coupling mechanism 52 includes a cover that fits over the adjacent terminals 48 and extends between the terminals 48, similar to a bus bar. The terminals 48 may abut a surface of the cover or may extend through an opening in a cover, thereby contacting the cover to establish the electrical path from one terminal 48, through the cover, to the adjacent terminal 48.

In some embodiments, a board 54 or cover may be disposed over the coupling mechanisms 52 and over the housing 31. The board 54 may be a flexible printed circuit board (PCB) configured to hold or retain various electronic components of the battery module 20. For example, the board 54 may include temperature and/or voltage sensors configured to monitor temperature and/or voltage across the electrochemical cells 30. The board 54 includes openings 56 configured to receive extensions 58 of the coupling mechanisms 52. The extensions 58 may be configured to accommodate reception by the openings 56. For example, the openings 56 may be cylindrical openings, and the extensions 58 may be cylindrical extensions. The extensions 58 are generally in electrical and/or thermal communication with the electrical path provided between the two adjacent terminals 48 coupled via the coupling mechanism 52. Accordingly, voltage and/or temperature sensors may be disposed in the board 54, and may extend into or proximate to the openings 56, thereby being exposed to the extensions 58 extending therethrough from the coupling mechanisms 52. The board 54 may include leads extending between the sensors disposed in the board 54 and one or more control units of the battery module 20, thereby providing temperature and/or voltage readings to the control unit. As shown, a top cover 60 of the battery module 20 may be disposed over the board 54 (e.g., PCB) to protect the leads, sensors, and any other electrical components disposed on the board 54 (e.g., PCB). For example, a bottom surface 61 of the board 54 (e.g., PCB) may seal against the housing 31 (e.g., a top surface 74 of the housing 31), and the top cover 60 may seal against the board 54 (e.g., PCB).

In the illustrated embodiment, a control unit 62 is disposed proximate to one end 38 of the housing 31. The control unit 62 may include an outer casing 64 configured to retain various electronic components of the battery module 20. For example, the electronic components may include a processor configured to receive temperature and/or voltage readings from the board 54 (e.g., PCB) of the battery module 20 or from other sensors disposed in the battery module 20. The control unit 62 may include a communication port 66 coupled to the electronic component(s) in the control unit 62, extending through the outer casing 64, and configured to receive a cable for transmitting information relating to the battery module 20 from the control unit 62 to a processor, control unit, or display disposed external to the battery module 20. Accordingly, operational parameters (e.g., temperature, voltage, efficiency, energy density) of the battery module 20 may be output to external hardware for monitoring and for ease of access. For example, an operator may couple a cable between the communication port 66 of the control unit 62 of the battery module 20 and an operator display external to the battery module 20, such that operational parameters are transmitted through the cable to the operator display and the operator can easily access and monitor the operating parameters of the battery module 20. Indeed, the control unit 62 may include a processor configured to store or track information relating to the battery module 20 over time, thereby providing a time history of the operating parameters of the battery module 20 to the operator. Unexpected results may alert the operator that the battery module 20 is in need of servicing. Additionally, the communication port 66 may be a two-way communication port. In this way, the operator may send input commands to the control unit 62 through the communication port 66, thereby adjusting operation parameters of the battery module 20.

Figure 4:
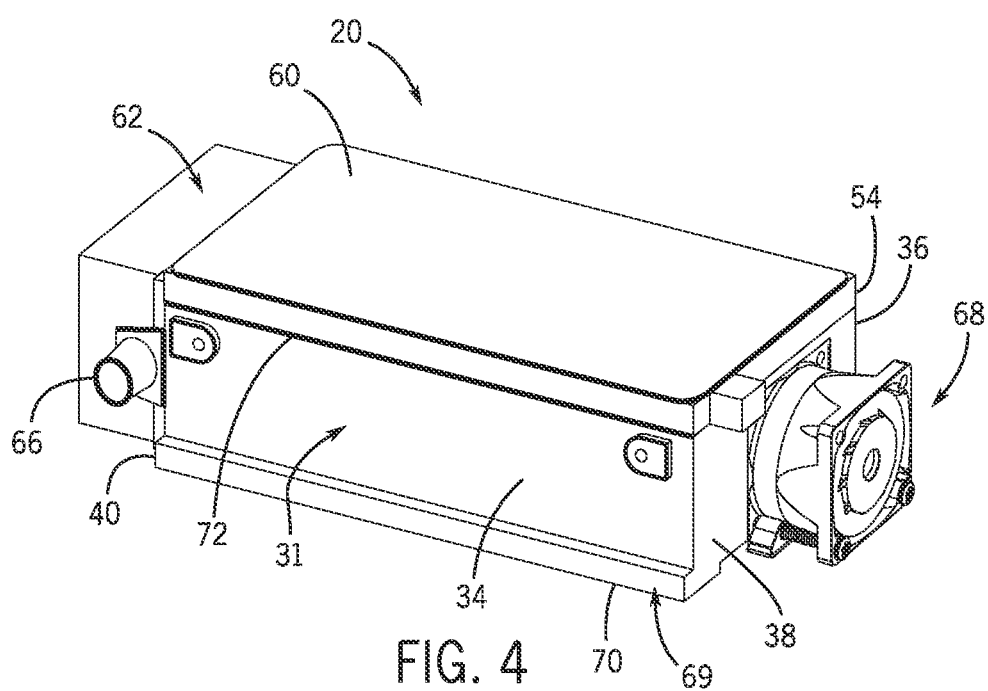
FIG. 4 is a perspective view of an embodiment of the battery module of FIG. 3, in accordance with an aspect of the present disclosure.

In the illustrated embodiment, a fan 68 may be disposed on the other end 40 of the housing 31 of the battery module 20, opposite to the end 38 having the control unit 62. In some embodiments, the fan 68 may be disposed on the same end of the battery module 20 having the control unit 62. Further, in some embodiments, the battery module 20 may not include the control unit 62. The illustrated fan 68 may be configured to generate an airflow proximate to the housing 31 (or within various portions of the housing 31) via a fluid guide assembly 69 disposed around the housing 31 and coupled to the fan 68. For example, in the illustrated embodiment, the fan 68 is coupled to an opening 71 in the end 40 of the housing 31 proximate to a bottom 70 of the housing 31. Further, the opening 71 is coupled to the fluid guide assembly 69 that extends under (or proximate to) the bottom 70 of the housing 31. In other words, the fluid guide assembly 69 may be disposed in or proximate to the bottom 70 of the housing 31 and may extend along or proximate to the base ends 44 of the electrochemical cells 30, such that the fan 68 enables an airflow through the fluid guide assembly 69 (e.g., proximate to the base ends 44 of the electrochemical cells 30) to extract heat from the base ends 44 via the airflow. In accordance with present embodiments, the fan 68 pulls air toward the fan 68 and through the fluid guide assembly 69 via an intake of the fan 68, which will be described in detail below. Further, embodiments of the fluid guide assembly 69 and components thereof will be described in detail with reference to later figures. For clarity, an assembled embodiment of the battery module 20 from FIG. 3 is shown in a perspective view in FIG. 4, where the battery module 20 includes the fluid guide assembly 69 proximate the bottom 70 of the housing 31. However, as will be shown in embodiments in later figures, the fluid guide assembly 69 may be disposed on or proximate to the bottom 70, a top 72 opposite to the bottom 70, the lateral sides 34, 36, or either end 38, 40 of the housing 31. Further, the fluid guide assembly 69 may be integral with the housing 31 (e.g., where the housing 31 includes fluid channels cut out of or integrally formed with the housing 31 itself), or the fluid guide assembly 69 may be a separate assembly coupled to an exterior or interior of the housing 31 (e.g., via fasteners, adhesives, or some other coupling device or feature). Embodiments of the fluid guide assembly 69 will be shown and described in detail below with reference to later figures.

Figure 5:
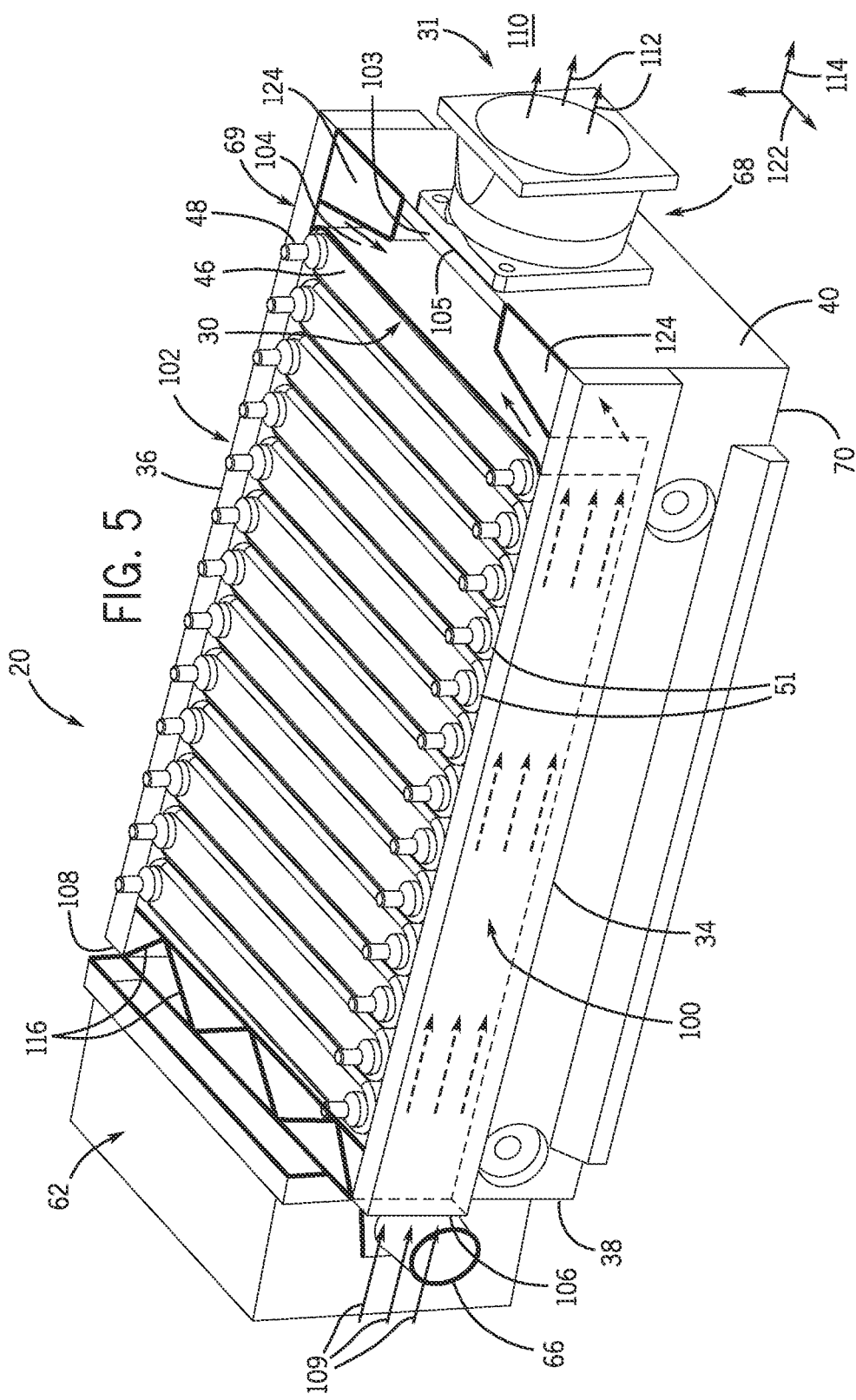
FIG. 5 is a perspective view of a portion of an embodiment of a battery module having a fluid guide assembly, in accordance with an aspect of the present disclosure.

Turning now to FIG. 5, a perspective view of a portion of an embodiment of the battery module 20 having the fluid guide assembly 69 is shown. In the illustrated embodiment, the fluid guide assembly 69 is integral with the two lateral sides 34, 36 of the housing 31. In other words, the fluid guide assembly 69 (e.g., duct) includes a first portion 100 (e.g., first segment, first body, first fluid passage, first cooling passage, first flow path) of the fluid guide assembly 69 extending along and formed within (e.g., internal to) one lateral side 34 and a second portion 102 (e.g., second segment, second body, second fluid passage, second cooling passage, second flow path) of the fluid guide assembly 69 extending along and formed within (e.g., internal to) the other lateral side 36, where the two portions 100, 102 are configured to enable an airflow therethrough. In the illustrated embodiment, the first and second portions 100, 102 extend proximate to the narrow faces 51 of the electrochemical cells 30 disposed between the two lateral sides 34, 36. In some embodiments, respective walls may separate the narrow faces 51 of the electrochemical cells 30 and the two portions 100, 102 (e.g., bodies or ducts). For example, one or more cooling walls having a material with higher thermal conductivity than base material of the housing 31 (e.g., of the lateral sides 34, 36 of the housing 31) may abut the narrow faces 51 on a first side and may be exposed to the first and second portions 100, 102 on a second side opposite to the first side. In some embodiments, the narrow faces 51 may extend through the cooling walls and the cooling walls may seal against the electrochemical cells 30, such that the narrow faces 51 are disposed directly in the airflow routed through the two portions 100, 102.

The illustrated portions 100, 102 (e.g., ducts or bodies of ducts) may have rectangular cross-sections (e.g., about direction 114) and are fluidly coupled at an end portion 104 (e.g., intervening segment) proximate to the end 40 of the housing 31. However, the two portions 100, 102 may have circular, ovular, or some other shaped cross-section configured to enable fluid (e.g., air) flow therethrough. The fan 68 is generally disposed proximate to and in fluid communication with an outlet 103 (e.g., opening or passage) extending through the end 40 of the housing 31. The outlet 103 (e.g., passage) is fluidly coupled to the end portion 104 (e.g., intervening portion) of the fluid guide assembly 69. However, in some embodiments, each portion 100, 102 may be separately coupled to the fan 68 (e.g., via the outlet 103 or multiple outlets), and, thus, may not be in fluid communication (e.g., except for within the fan 68). Further, in the illustrated embodiment, an air intake 105 of the fan 68 abuts, and is fluidly coupled to, the outlet 103. Accordingly, the fan 68 draws air into the fan 68 from the end portion 104 of the fluid guide assembly 69, through the outlet 103 and the air intake 105. Inlets 106, 108 (e.g., openings) to the fluid guide assembly 69 are disposed in the opposing end 38 of the housing 31, opposite to the end 40 having the fan 68. For example, one inlet 106 is coupled to the first portion 100 of the fluid guide assembly 69 and another inlet 108 is coupled to the second portion 102 of the fluid guide assembly 69. Thus, air is pulled into the two portions 100, 102 of the fluid guide assembly 69 through the inlets 106, 108 (e.g., shown by arrows 109) via a pressure difference generated by the fan 68 on the other end 40 of the housing 31. The air travels from the inlets 106, 108, through the portions 100, 102 (e.g., bodies, fluid passages, cooling passages, fluid paths, flow paths) of the fluid guide assembly 69 (proximate to the narrow faces 51 of the electrochemical cells 30), into the end portion 104 of the fluid guide assembly 69, through the outlet 103, and through the air intake 105 of the fan 68. The fan 68 blows the air out of the fluid guide assembly 69 into the surrounding environment 110, as shown by arrow 112, generally in direction 114. It should be noted, however, that in some embodiments, the inlets 106, 108 (e.g., openings or inlet openings) may actually be outlets (e.g., openings or outlet openings), and that the fan 68 may be configured to draw in air from the surrounding environment 110 and blow the air through the two portions 100, 102 of the fluid guide assembly 69.

In general, in the illustrated embodiment, the air extracts heat from the electrochemical cells 30 through the narrow faces 51 of the electrochemical 30. As shown, the housing 31 may include a truss or zig-zag structure 116 extending along the end 38 of the housing 31 (e.g., the end 38 having the inlets 106, 108) in direction 121. The structure 116 may provide structural rigidity to the housing 31, particularly proximate to the inlets 106, 108 of the fluid guide assembly 69 through the end 38 of the housing 31. Further, quadrilateral shaped structures 127 may be disposed in the housing 31 proximate to the end 40 of the housing 31 having the fan 68. The structures 127 may provide further rigidity to the housing 31, particularly to the end 40 of the housing 31 having the outlet 103 and the fan 68 coupled to the outlet 103.

It should be noted that the illustrated fluid guide assembly 69 is integral with the housing 31, but that a similar fluid guide assembly 69 may be separately assembled and fastened to the housing 31. Additionally, in some embodiments, part of the fluid guide assembly 69 may be defined by the housing 31 and part of the fluid guide assembly 69 may be separately attached (e.g., coupled) to the housing 31. For example, the lateral sides 34, 36 of the housing 31 may operate as a portion of the fluid guide assembly 69 and a separately attached structure may operate as a portion of the fluid guide assembly 69. Further, although the fan 68 is shown disposed on the end 40 of the housing 31, the fan 68 may also be disposed in (e.g., within) the end 40 of the housing 31. For example, the fan 68 may be disposed in the area of the end 40 of the housing 31 having the illustrated outlet 103. The illustrated housing 31 described above is a portion of only one embodiment of the battery module 20 having the presently disclosed fluid guide assembly 69, and should not limit the present disclosure to battery modules having only integral fluid guide assemblies 69 (e.g., integrally formed with the housing 31) and/or only fans 68 disposed external to the housing 31. Other embodiments will be described in detail with reference to later figures.

Figure 6:
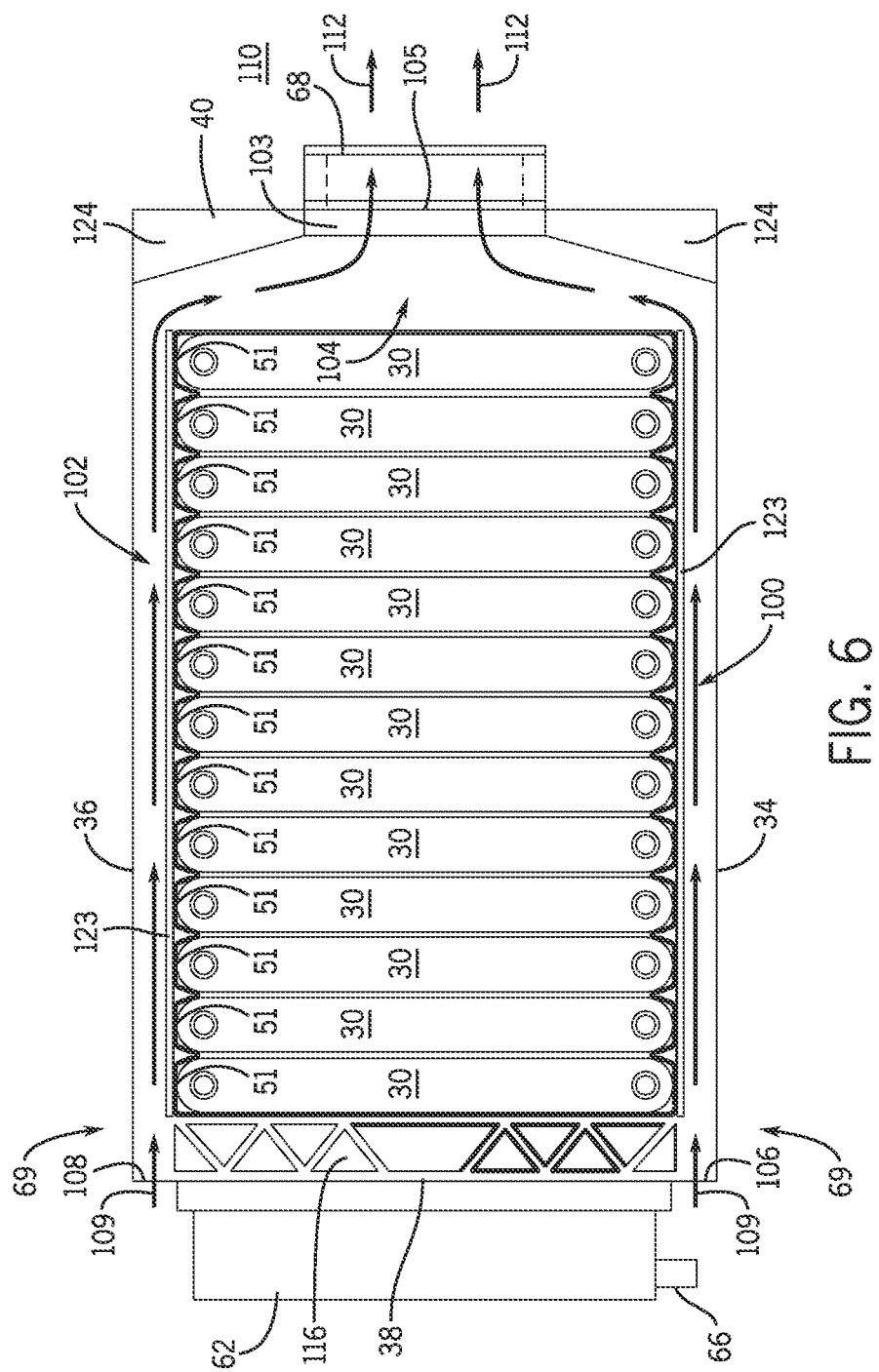
FIG. 6 is a schematic top view of the fluid guide assembly of FIG. 5, in accordance with an aspect of the present disclosure.

For clarity, a schematic top view of the fluid guide assembly 69 in FIG. 5 is shown in FIG. 6. As shown, the inlets 106, 108 to the two portions 100 of the fluid guide assembly 69 extend through one end 38 of the housing 31. The zig-zag structure 116 provides structural rigidity to the end 38. The fan 68 is disposed in fluid communication with the outlet 103 on the opposing end 40 of the housing 31 and configured to blow air in direction 114, as shown by arrow 112. Thus, the fan 68 draws air into the fan 68 through the air intake 105 proximate to the outlet 103 of the fluid guide assembly 69. The outlet 103 is fluidly coupled to the end portion 104, and the end portion 104 is fluidly coupled to both the first and second portions 100, 102 of the fluid guide assembly 69 extending along the lateral sides 34, 36 of the housing 31 (and, thus, along the thin faces 51 of the electrochemical cells 30). Thus, the fan 68 draws air through the portions 100, 102 of the fluid guide assembly 69 (e.g., via the inlets 106, 108), thereby extracting heat from the electrochemical cells 30 through, for example, the thin faces 51. As previously described, the illustrated fluid guide assembly 69 may be integral with the housing 31, may be separate from the housing 31 and coupled to the housing 31, or may include certain portions integral with the housing 31 and certain portions separate from the housing 31. Further, the fan 68 may be disposed external to the housing 31 or in an opening of the housing 31 (e.g., in the outlet 103). Further still, as previously described, cooling plates 123 may be disposed between the narrow faces 51 of the electrochemical cells 30 and the first and second portions 100, 102 of the fluid guide assembly 69.

Figure 7:
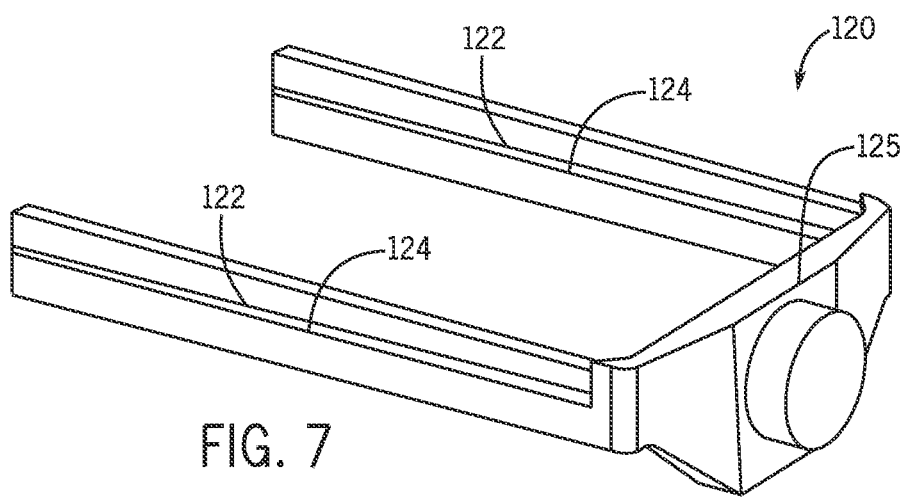
FIG. 7 is a perspective view of an embodiment of an airflow through the fluid guide assembly of FIG. 5, in accordance with an aspect of the present disclosure.
Figure 8:
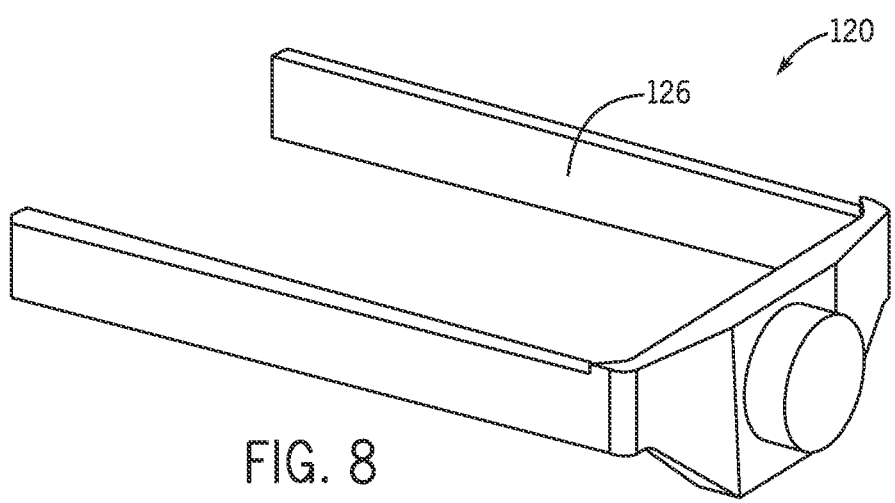
FIG. 8 is a perspective view of an embodiment of an airflow through the fluid guide assembly of FIG. 5, in accordance with an aspect of the present disclosure.

It should be noted that the fluid guide assembly 69 illustrated in FIGS. 5 and 6 may include multiple ducts or flow passages for each portion 100, 102 extending along the lateral sides 34, 36 of the housing 31. To help illustrate, perspective views of embodiments of an air volume 120 through the fluid guide assembly 69 of FIGS. 5 and 6 is shown in FIGS. 7 and 8. In FIG. 7, the air volume 120 includes a first air volume portion 122 and a second air volume portion 124. For example, each of the first and second portions 100, 102 of the fluid guide assembly 69 may include a separating wall extending through the portions 100, 102 generally parallel with the airflow. The separating wall may isolate two flow paths in each of the first and second portions 100, 102, thereby providing two separate air volume portions 122, 124 that are not initially in fluid communication. Alternatively, the two air volume portions 122, 124 may not be separate, but the first (e.g., upper) air volume portion 122 may be thinner than the second (e.g., lower) air volume portion 124 by way of a member of the fluid guide assembly 69 extending into the airflow proximate to the upper air volume portion 122. This may enable a higher flow rate of air through the upper portion 122 than the lower portion 124. In either configuration, the two air volume portions 122, 124 may converge into a single end air volume portion 125 (e.g., within the end portion 104 of the fluid guide assembly 69 in FIG. 6). These configurations may, in some embodiments, provide more even cooling to upper and lower portions of the electrochemical cells 30. Alternatively, in some embodiments (as shown in FIG. 8), each of the first and second portions 100, 102 of the fluid guide assembly 69 may include a single air volume portion 126 (e.g., without the separating walls or extending features described above).

Figure 9:
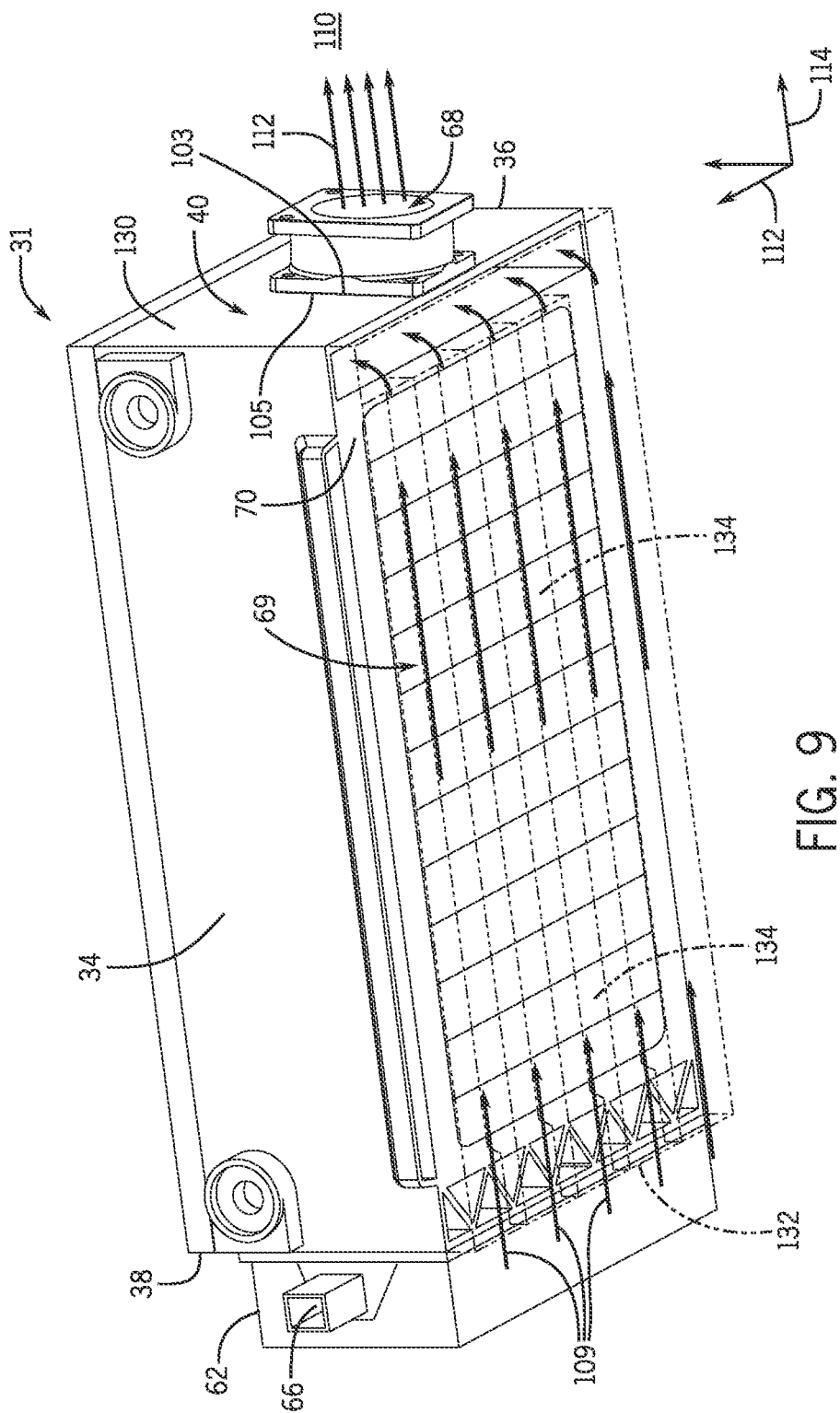
FIG. 9 is a bottom perspective view of an embodiment of a battery module having a fluid guide assembly, in accordance with an aspect of the present disclosure.

In some embodiments, the fluid guide assembly 69 may extend along a different face or side of the housing 31 of the battery module 20 than is shown in FIGS. 5 and 6. For example, a bottom perspective view of an embodiment of one battery module 20 having the fluid guide assembly 69 disposed proximate to the bottom 70 of the housing 31 is shown in FIG. 9. In the illustrated embodiment, the fan 68 is disposed on an external surface 130 on the end 40 of the housing 31, as previously described, although the fan 68 may be embedded within the end 40 of the housing 31 in other embodiments. For example, in the illustrated embodiment, the air intake 105 of the fan 68 may be coupled to an opening (e.g., outlet 103) extending through the end 40 of the housing 31 to the external surface 130. The fan 68 pulls air through the air intake 105 of the fan 68 and blows the air into the surrounding environment 110, generally in direction 114. The air intake 105, as previously described, is coupled to one or more portions of the fluid guide assembly 69 (e.g., the outlet 103), wherein the fluid guide assembly 69 is disposed below the housing 31 on the bottom 70 of the housing 31 in the illustrated embodiment.

The illustrated fluid guide assembly 69 may include a single bottom inlet 132 proximate to the end 38 of the housing 31 opposite to the end 40 having the fan 68. In embodiments having an integral fluid guide assembly 69, the bottom inlet 132 may be disposed in the end 38 of the housing 31 itself. In embodiments having a fluid guide assembly 69 separate from the housing 31, the bottom inlet 132 may be disposed in the separate fluid guide assembly 69. As shown via arrows 109, air is drawn into a single bottom duct 134 (e.g., cooling passage, fluid passage, flow path) of the fluid guide assembly 69 (e.g., proximate the bottom 70 of the housing 31), via a pressure difference generated by the fan 68 on the opposing end 40 of the housing 31. The air is drawn through the single duct 134 of the fluid guide assembly 69 across the bottom 70 of the housing 31. It should be noted that, in other embodiments, the illustrated fluid guide assembly 69 may include multiple ducts, such as 2, 3, 4, 5, 6, or more ducts. For example, the illustrated single duct 134, in other embodiments, may include partitions segmenting the single duct 134 into multiple separate ducts, all of which being fluidly coupled to the inlet 132. Further, it should be noted that, in some embodiments, the fluid guide assembly 69 may include ducts along the bottom 70 of the housing 31 and along the lateral sides 34, 36 of the housing 31. For example, one battery module 20 may include a fluid guide assembly 69 having a configuration that combines features shown in FIG. 5 (e.g., first and second portions 100, 102, ducts, or bodies of ducts) with features shown in FIG. 9 (e.g., the single duct 134 across the bottom 70).

Figure 10:
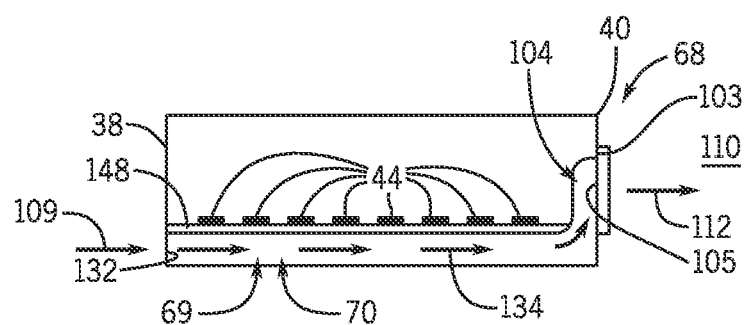
FIG. 10 is a schematic side view of an embodiment of the fluid guide assembly of FIG. 9, in accordance with an aspect of the present disclosure.

For clarity, continuing with the embodiment described in FIG. 9, a schematic side view of the fluid guide assembly 69 and battery module 20 in FIG. 9 is shown in FIG. 10. As shown, the bottom inlet 132 (e.g., bottom opening) to the single duct 134 of the fluid guide assembly 69 extends into fluid communication with the fluid guide assembly 69 proximate to the back end 38, where the back end 38 is opposite to the front end 40 having the outlet 103 and the fan 68 coupled to the outlet 103 at the fan's air intake 105. The bottom inlet 132 enables air to be drawn into the fluid guide assembly 69, as shown by arrow 109, via the pressure difference generated by the fan 68 between the fluid guide assembly 69 and the surrounding environment 110. The fan 68 draws air through the bottom inlet 132, through the single duct 134 of the fluid guide assembly 69, through the outlet 103, and into the air intake 105. The fan 68 discharges the air into the surrounding environment 110 (e.g., as shown by arrow 112). In the illustrated embodiment, the fluid guide assembly 69 routes the air proximate to the bottom 70 of the housing 31, thereby extracting heat from the base ends 44 of the electrochemical cells 30 disposed proximate to the bottom 70 of the housing 31. After extracting heat from the electrochemical cells 30, the air is drawn into the end portion 104 of the fluid guide assembly 69, through the outlet 103, and through the air intake 105, and is then pushed into the surrounding environment 110 by the fan 68, as described above.

Figure 11:
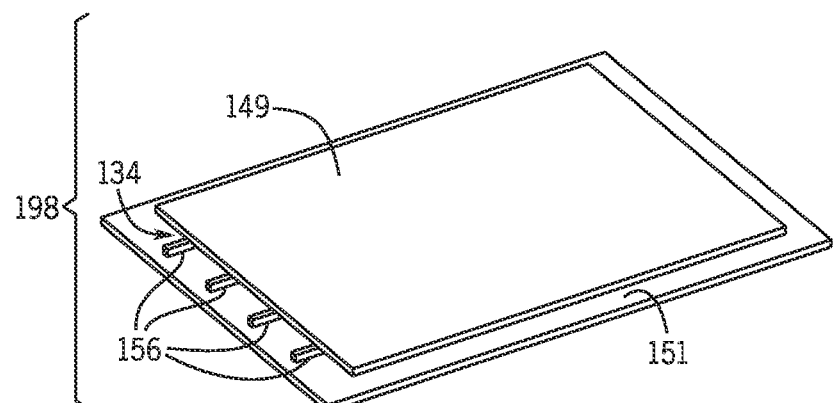
FIG. 11 is a perspective view of an embodiment of cold plates for use in the fluid guide assembly of FIG. 9, in accordance with an aspect of the present disclosure.

As shown in the illustrated illustrated embodiment, the battery module 20 may include a bottom cooling plate 148 disposed proximate to the fluid guide assembly 69 and exposed to the duct 134 of the fluid guide assembly 69. For example, the bottom cooling plate 148 may be disposed in contact with the base ends 44 of the electrochemical cells 30 and exposed to the duct 134 of the fluid guide assembly 69. Further, the bottom cooling plate 148 may include cooling fins or other features extending from the cooling plate 148 and into the duct 134 of the fluid guide assembly 69, thereby extending into the airflow generated by the fan 68. Further still, in some embodiments, the fluid guide assembly 69 may include multiple cooling plates 148. For example, the fluid guide assembly 69 may include one cooling plate 148 on either side of the fluid guide assembly 69 and extending along the fluid guide assembly 69 parallel to an expected airflow through the fluid guide assembly 69. In FIG. 11, a perspective view of an embodiment of two bottom cooling plates 148 for use in the fluid guide assembly 69 (e.g., proximate to the bottom duct 134) of FIG. 9 is shown. In the illustrated embodiment, an upper plate 149 and a lower plate 151 are shown. The duct 134 of the fluid guide assembly 69 may be between the upper and lower plates 149, 151. For example, the upper and lower plates 149, 151 may define at least a portion of the duct 134. Further, as shown, the lower plate 149 includes cooling fins 156 configured to extend into the path of the airflow routed through the duct 134 between the lower and upper plates 149, 151. In some embodiments, cooling fins 156 may extend downwardly from the upper plate 151 into the path of the airflow.

Figure 12:
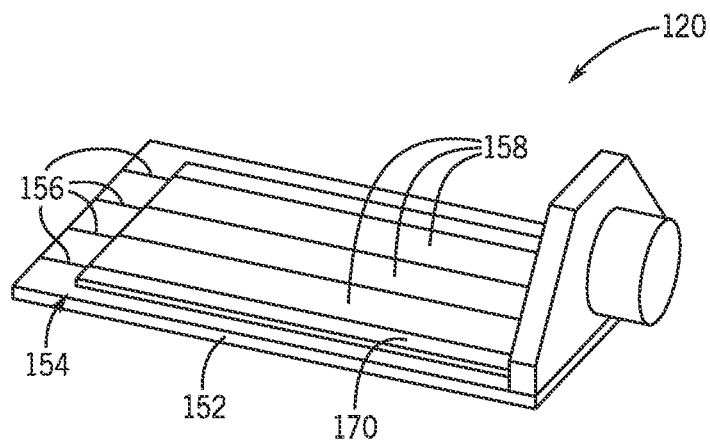
FIG. 12 is a perspective view of an embodiment of an airflow through the fluid guide assembly of FIG. 9, in accordance with an aspect of the present disclosure.
Figure 13:
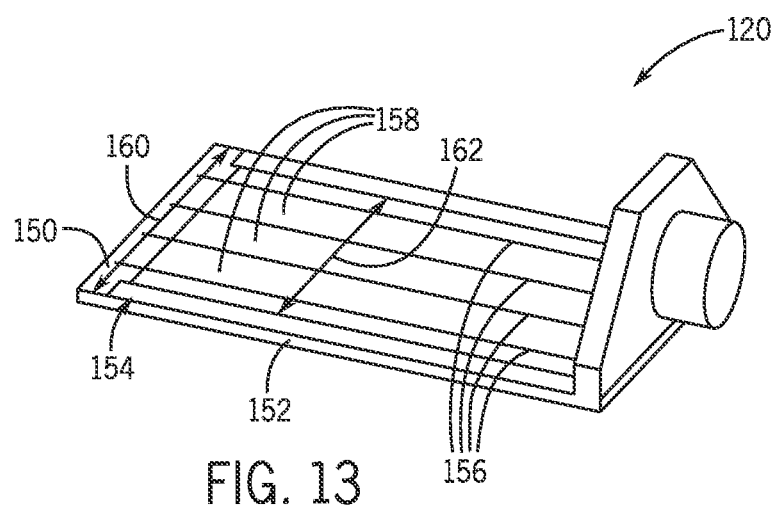
FIG. 13 is a perspective view of an embodiment of an airflow through the fluid guide assembly of FIG. 9, in accordance with an aspect of the present disclosure.

For clarity, perspective views of embodiments of air volumes 120 (e.g., airflows) through the embodiments of duct 134 of the fluid guide assembly 69 are shown in FIGS. 12 and 13. It should be noted that only the air volumes 120 are shown in FIGS. 12 and 13 (e.g., the cooling plates 148 are not shown). However, certain features of the battery module 20 are represented schematically, as described below. In FIG. 12, the air volume 120 includes an upper portion 150 and a lower portion 152. For example, an outer ridge of the fluid assembly 69 (or of the cooling plate 148) may extend along a periphery 154 of the airflow (e.g., air volume 120), thereby facilitating the upper and lower portions 150, 152 of the air volume 120, where the upper portion 150 is level with, and inside, the outer ridge (e.g., inside a recess defined inside the outer ridge of the cooling plate), and the lower portion 152 is below the outer ridge. Further, cooling fins 156 may extend from one of the cooling plates 148 in FIG. 11 into the air volume 120 in FIG. 12. The cooling fins 156 are represented by cooling fin lines 156 in the illustrated embodiment. The cooling fins 156 may extend into the upper portion 150, the lower portion 152, or both the upper and lower portions 150, 152. Further, although the cooling plate 148 is shown above the duct 134 in the embodiment in FIG. 10, one or more cooling plates 148 may also be disposed below the duct 134 (as shown in FIG. 11). Accordingly, the cooling fins 156 may extend from a bottom of the fluid guide assembly 69 upwardly, from a top of the fluid guide assembly 69 downwardly, or both. In general, the cooling fins 156 increase a surface area of which the air volume 120 contacts (e.g., passes over), thereby enhancing a heat transfer coefficient of the fluid guide assembly 69 and the cooling plate 148 thereof. Further, the cooling fins 156 may at least partially segment (e.g., separate) the air volume 120, thereby providing at least partially separated channels 158. This may enable a more even cooling of the electrochemical cells 30 through the base ends 44 of the electrochemical cells 30 (e.g., the base ends 44 shown in FIG. 10).

In FIG. 13, the air volume 120 includes similar upper and lower portions 150, 152, although the outer ridge of the fluid guide assembly 69 (or cooling plate 148) does not extend around the entire periphery 154 of the air volume 120. For example, the outer ridge may simply restrict a cross-sectional width of the upper portion 150 from a first width 160 to a second width 162.

Figure 14:
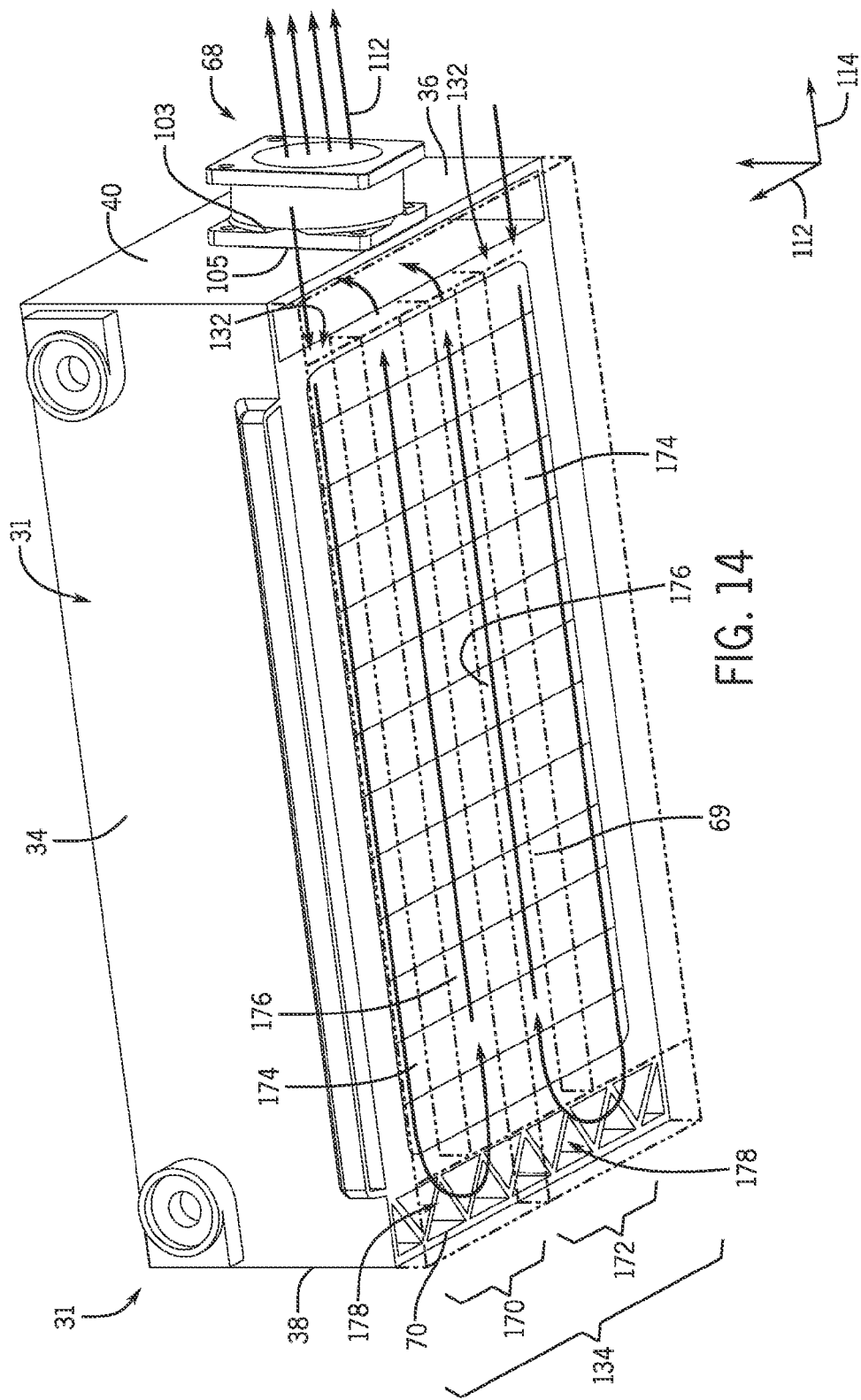
FIG. 14 is a bottom perspective view of an embodiment of a battery module having a fluid guide assembly, in accordance with an aspect of the present disclosure.

In some embodiments, the fluid guide assembly 69 may be configured to provide multiple fluid flow paths that route airflow generated by the fan 68 in alternating directions. For example, a bottom perspective view of an embodiment of the battery module 20 having the fluid guide assembly 69 with fluid flow in alternating directions is shown in FIG. 14. The illustrated embodiment of the battery module 20 is similar to the embodiment shown in FIG. 9, in that both modules 20 include the fluid guide assembly 69 disposed across the bottom 70 of the housing 31. However, in FIG. 14, the fluid guide assembly 69 includes the bottom inlet 132 proximate to the same end 40 of the housing 31 that includes the fan 68. The duct 134 is partitioned into a first bottom portion 170 (e.g., first flow path) and a second bottom portion 172 (e.g., second flow path) laterally adjacent to the first bottom portion 170. Each portion 170, 172 includes two flow segments 174, 176. The first segments 174 are coupled to the bottom inlet 132 and configured to receive air drawn in through the bottom inlet 132. Accordingly, the air flows through the first segments 174 opposite to direction 114. The air is then rerouted via connecting portions 178 between the first segments 174 and the second segments 176. For example, the illustrated connecting portions 178 are 180 degree turns coupling the first segments 174 and the second segments 176. After passing through the connection portions 178, the air travels through the second segments 176 in direction 114, toward the outlet 103 on the end 40 of the housing 31. The fan 68, which is coupled to the end 40 of the housing 31 over the outlet 103 in the end 40 via the air intake 105 of the fan 68, draws the air through the air intake 105 and expels the air to the surrounding environment 110, as shown by arrows 112 and as previously described. Indeed, the fan 68 generates the pressure differential to draw the air in through the bottom inlet 132 of the guide assembly 69. In other words, the fan 68 is the mechanism by which the air is drawn through the duct 134, as previously described.

Figure 15:
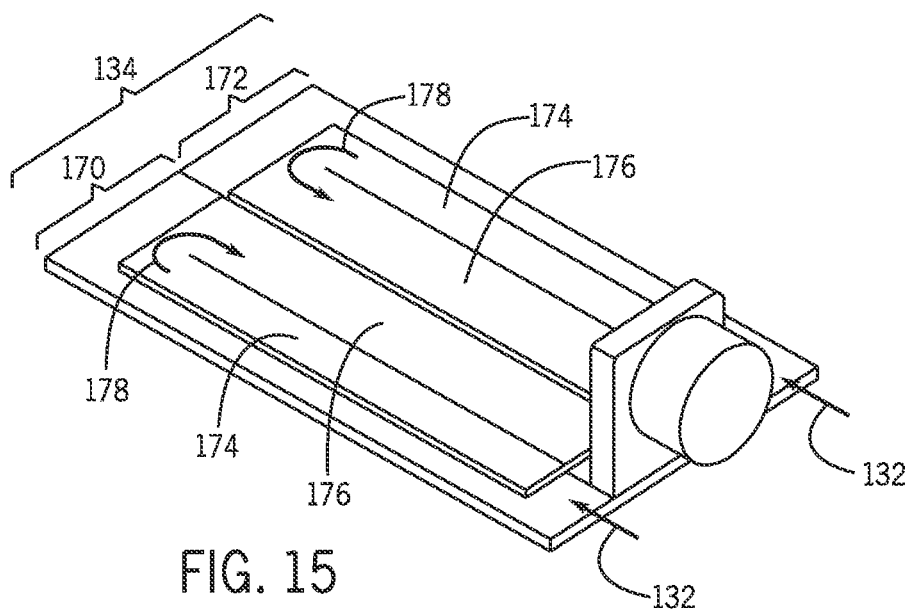
FIG. 15 is a perspective view of an embodiment of an airflow through the fluid guide assembly of FIG. 14, in accordance with an aspect of the present disclosure.
Figure 16:
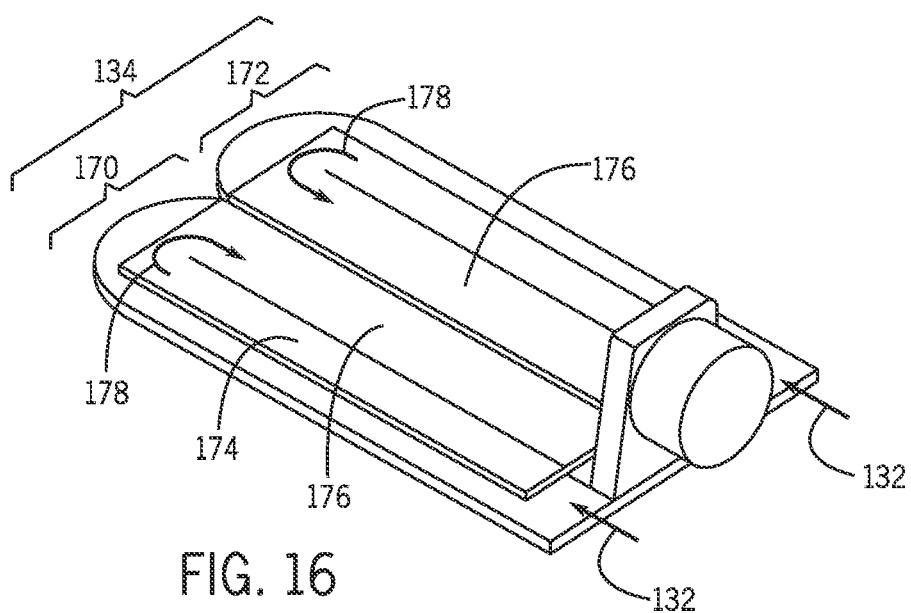
FIG. 16 is a perspective view of an embodiment of an airflow through the fluid guide assembly of FIG. 14, in accordance with an aspect of the present disclosure.

It should be noted that, according to the present disclosure, the first segments 176 of the first and second bottom portions 170, 172 may be disposed outside of the second segments 178 (as shown) or inside of the second segments 178. Further, the inlet(s) 132 to the duct 134 in the illustrated embodiment may include a single inlet 132 or may include two separate inlets 132 for the first segments 176 of the first and second bottom portions 170, 172 of the bottom duct 134. Further, the connection portions 178 may be rounded, squared, or shaped in some other manner to accommodate rerouting of the airflow through the duct 134 in a substantially 180 degree turn. It should be noted that the bottom duct 134 may include fluid flow in other directions and may include any number of segments configured to route the air in any number of directions. However, the illustrated embodiment in FIG. 14 is configured to provide a more even heat extraction from the base ends 44 of the electrochemical cells 30. For example, in the first pass through the first segments 174, the air gets hotter as the air travels from the first end 40 of the housing 31 to the second end 38 of the housing 31. In the second pass through the second segments 176, the air gets hotter as the air travels from the second end 38 of the housing 31 to the first end 40 of the housing 31. Thus, the illustrated arrangement is configured to reduce a thermal gradient that may arise in direction 114 through the battery module 20. Various embodiments of the air volume 120 (e.g., airflow) through the first and second bottom portions 170, 172 of the bottom duct 134 are shown in FIGS. 15 and 16. The embodiment in FIG. 15 includes a rectangular connection portion 178 that reroutes the air in a substantially 180 degree turn and the embodiment in FIG. 16 includes a rounded connecting portion 178 that reroutes the air in a substantially 180 degree turn, as previously described.

Figure 17:
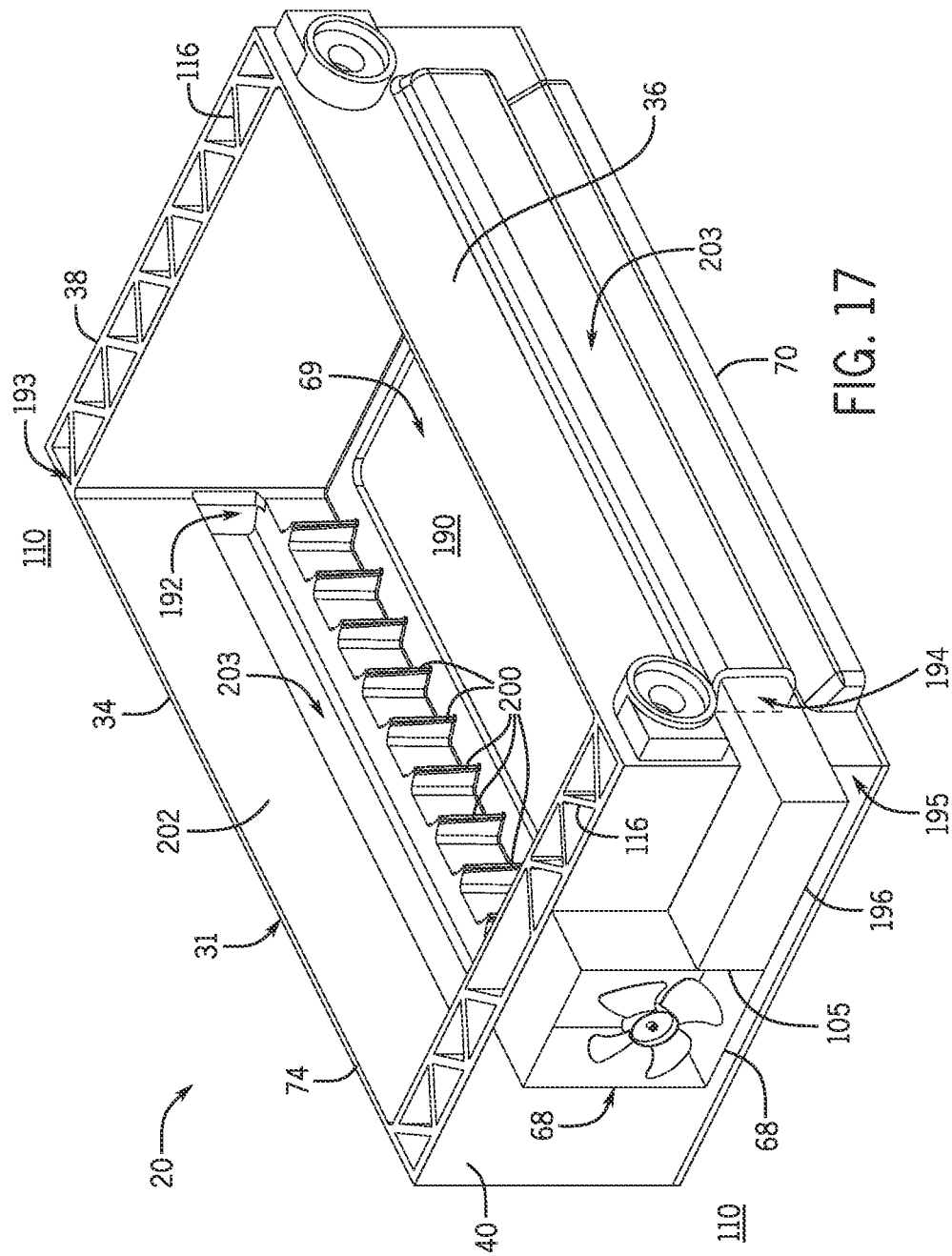
FIG. 17 is a perspective view of an embodiment of a housing of a battery module having a fluid guide assembly, in accordance with an aspect of the present disclosure.

In some embodiments, the battery module 20 may include a fluid guide assembly 69 with features configured to enable cooling on an inside of the housing 31 between the lateral walls 34, 36 and the ends 38, 40 of the housing 31. For example, a perspective view of an embodiment of a portion of the battery module 20, having the fluid guide assembly 69 configured to enable internal cooling to the electrochemical cells 30 on an inside 190 of the housing 31, is shown in FIG. 17. In the illustrated embodiment, the housing 31 includes a housing inlet 192 proximate to a first corner 193 of the housing 31 (e.g., the corner 193 between the lateral side 34 and the end 38) and a housing outlet 194 proximate to a second corner 195 of the housing 31 (e.g., the corner 195 between the lateral side 36 and the end 40). The air intake 105 of the fan 68 is coupled to the housing outlet 194 via a coupling duct 196 (e.g., flow passage, fluid passage) that extends around the corner 195, from the housing outlet 194 to the air intake 105. The fan 68 draws air into the fan 68 through the air intake 105, such that air is pulled through the coupling duct 196 from the inside 190 of the housing 31 and to and through the air intake 105. Normally, a cover assembly is disposed onto the top surface 74 (e.g., edge) of the housing 31 to seal the inside 190 of the housing 31 although, for clarity, the cover assembly is not shown in the illustrated embodiment. Thus, the inside 190 of the housing 31 is generally sealed. Accordingly, the air drawn into the coupling duct 196 (e.g., through the housing outlet 194) is drawn in from the inside 190 of the housing 31, and the air in the inside 190 of the housing 31 is drawn in through the housing inlet 192 from the surrounding environment 110. It should be noted that, in accordance with the illustrated embodiment, the inside 190 of the housing 31 may be considered a portion of a cooling duct of the fluid guide assembly 69. In other words, air is drawn through the inside 190 of the housing 31, thereby rendering the inside 190 of the housing 31 a portion (e.g., a duct) of the fluid guide assembly 69.

As shown in the illustrated embodiment, spacers 200 disposed on an internal surface 202 on the inside 190 of the housing 31 generally define slots configured to receive the electrochemical cells 30. The spacers 200 are shown on the internal surface 202 of the lateral sides 34, 36. The spacers 200 space the electrochemical cells 30 apart such that the air routed from the housing inlet 192 to the housing outlet 194 travels through (e.g., between) adjacent electrochemical cells 30. Further, bulges 203 extending outwardly from the lateral sides 34, 36 define additional airspaces on the inside 190 of the housing 31 through which the airflow may travel. For example, the bulges 203 define airspaces proximate to the narrow faces 51 of the electrochemical cells 30 (e.g., of the electrochemical cells 30 shown in FIG. 3). As shown in the illustrated embodiment, the housing inlet 192 and the housing outlet 194 are disposed catty-corner to each other (e.g., at, or proximate to, diagonally opposing corners 193, 195). By disposing the housing inlet 192 and the housing outlet 194 catty-corner to each other, the airflow generated by the fan 68 is generally routed through (e.g., between) all the electrochemical cells 30 disposed in the inside 190 of the housing 31, as the airflow must travel diagonally through the inside 190 of the housing 31 and the electrochemical cells 30 are generally disposed in the inside 190 of the housing 31 within the diagonal flow path. Thus, the airflow may travel between the electrochemical cells 30, through the airspaces defined by the bulges 203 extending outwardly from the lateral sides 34, 36 of the housing 31, or through a combination thereof. Positioning the housing inlet 192 and the housing outlet 194 on the same side (e.g., not catty-corner to one another) would cause the airflow to travel along only one of the lateral sides 34, 36 of the housing 31 (e.g., within one of the airspaces defined by one of the bulges 203) without traveling through (e.g., between) the electrochemical cells 30 and/or through the airspace defined by the opposing bulge 203.

Figure 18:
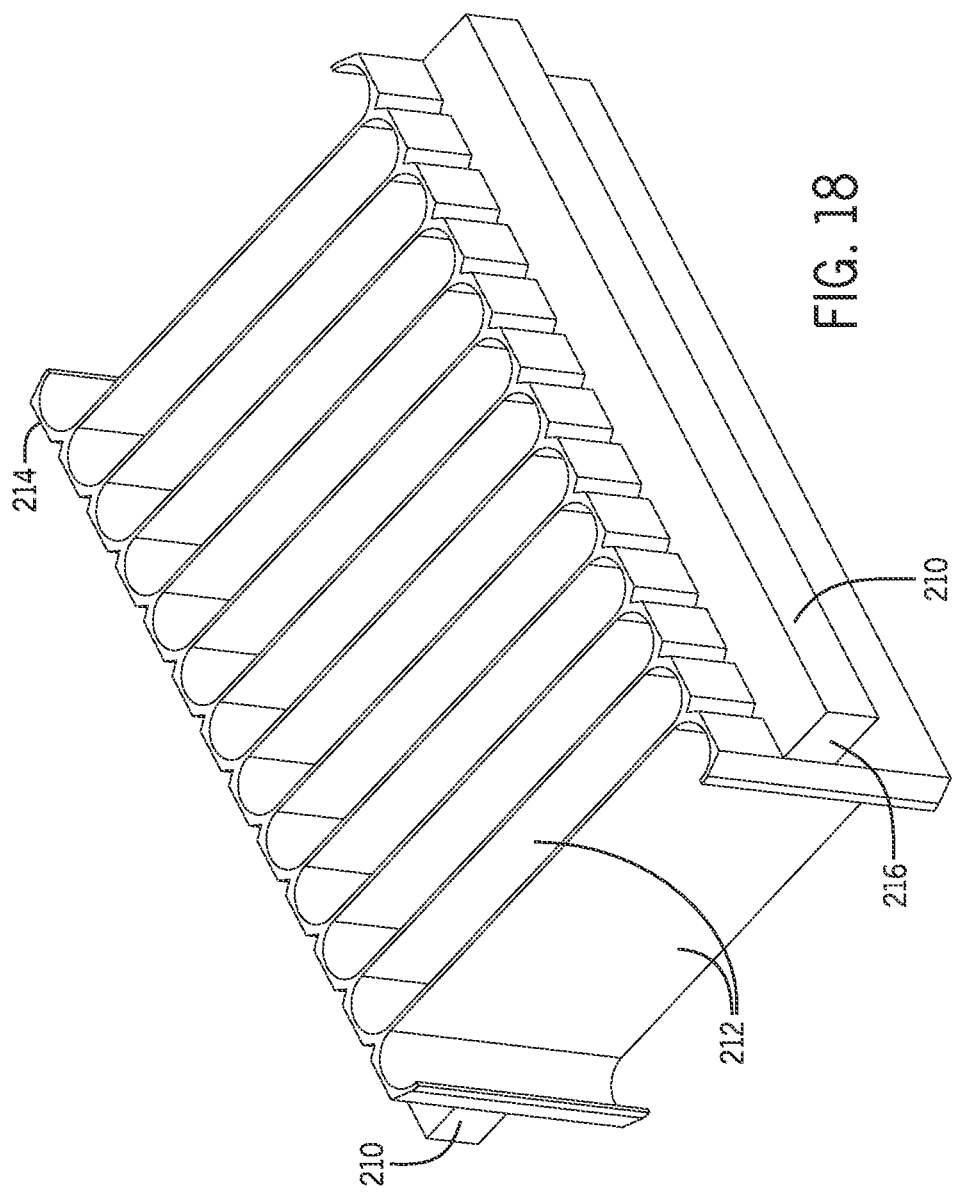
FIG. 18 is a perspective view of an embodiment of an airflow through the fluid guide assembly of FIG. 17, in accordance with an aspect of the present disclosure.
Figure 19:
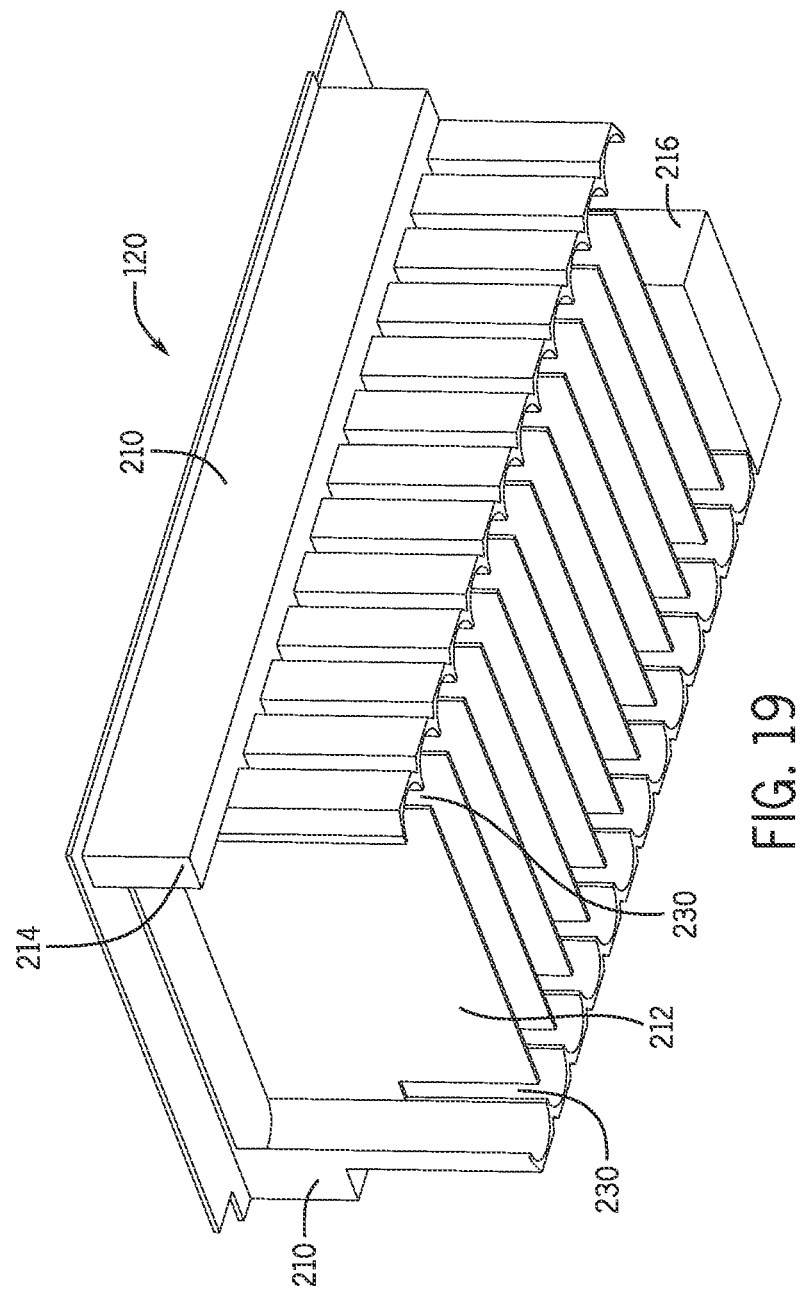
FIG. 19 is a perspective view of an embodiment of an airflow through a fluid guide assembly at least partially inside of a housing of a battery module, in accordance with an aspect of the present disclosure.
Figure 20:
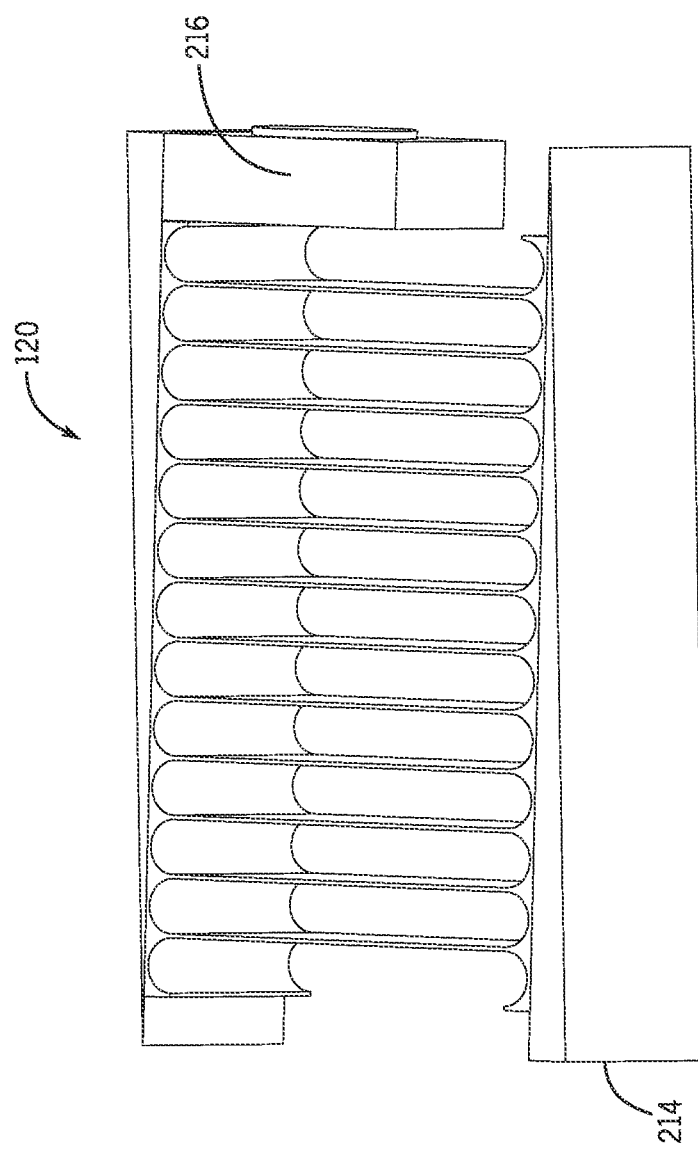
FIG. 20 is a perspective view of an embodiment of a fluid guide assembly at least partially inside of a housing of a battery module, in accordance with an aspect of the present disclosure.

For clarity, a perspective view of an embodiment of the air volume 120 through the inside 190 of the housing 31 is shown in FIG. 18. It should be noted that reference is made to certain elements of the battery module 20 shown in FIG. 17 (e.g., of the housing 31 of the battery module 20) but not FIG. 18. Thus, the following description is made with reference to both FIGS. 17 and 18. In the illustrated embodiment, the air volume 120 includes bulge portions 210 that extend into the airspace defined by the bulges 203 extending outwardly from the lateral sides 34, 36 of the housing 31 in FIG. 17. The air volume 120 also includes traverse portions 212 that traverse the two bulge portions 210. The traverse portions 212 generally extend between the electrochemical cells 30 and cool the broad faces 50 of the electrochemical cells 30 (e.g., the broad faces 50 shown in FIG. 3). Accordingly, the airflow is enabled to travel from an inlet side 214 at the housing inlet 192 diagonally to an outlet side 216 at the housing outlet 194 (e.g., through the bulge portions 210 and between the electrochemical cells 30 through the traverse portions 212). The airflow may exit the housing outlet 194 and travel through the coupling duct 196 to the air intake 105 of the fan 68, which pulls the air through the flow path extending through the inside 190 of the housing 31, as shown in FIG. 17. Indeed, the fan 68 draws the air into the housing inlet 192, through the inside 190 of the housing 31, to the housing outlet 194, through the coupling duct 196, and through the air intake 105, and expels the air to the surrounding environment 110. It should be noted that the battery module 20 (and, in particular, the housing 31 of the battery module 20) may have certain other features configured to extend into the air volume 120 shown in FIG. 18, thereby altering the shape of the air volume 120 and the airflow through the inside 190 of the housing 31. Various embodiments of air volumes 120 extending between the inlet side 214 of the air volume 120 (e.g., at the housing inlet 192) and the outlet side 216 of the air volume 120 (e.g., at the housing outlet 194) are shown in FIGS. 19 and 20. For example, in FIG. 19, the traverse portions 212 of the air volume 120 may include impeded portions 230 on either side of the traverse portions 212, which may be impeded by features of the housing 31 or electrochemical cells 30 extending into the traverse portions 212.

As previously described it should be noted that in any of the previously described embodiments, the fan 68 may be turned around such that the air intake 105 of the fan 68 faces the surrounding environment 110 and the fan 68 blows air through the fluid guide assembly 69 away from the fan 68, as opposed to drawing air through the fluid guide assembly 69 toward the fan 68. In other words, in some embodiments, the fan 68 may draw air from the surrounding environment 110 and blow the air through the fluid guide assembly 69, as opposed to drawing air from the fluid guide assembly 69 and blowing the air into the surrounding environment 110.

One or more of the disclosed embodiments, alone or in combination, may provide one or more technical effects useful in the manufacture of battery modules, and portions of battery modules. In general, the disclosed battery modules include thermal management features generally configured to enhance thermal management of the battery modules. For example, the thermal management features include a fan coupled to a fluid guide assembly of the battery module. The fan is configured to draw air through the fluid guide assembly toward the fan. The fluid guide assembly may be disposed on any face or side (or inside) of a housing of the battery module, and may be integral with the housing or separately assembled and coupled to the housing. Further, the fluid guide assembly may include one or more cooling plates exposed to flow paths of the fluid guide assembly and configured to provide enhanced heat transfer from the electrochemical cells of the battery module to the flow path, such that an airflow routed through the flow path may extract the heat from the one or more cooling plates. In general, the thermal management features disclosed herein (e.g., the fan and the fluid guide assembly) are configured to provide enhanced heat extraction from the electrochemical cells while reducing a volume of the battery module devoted to storing the thermal management features, thereby increasing an energy density of the battery module. The technical effects and technical problems in the specification are exemplary and are not limiting. It should be noted that the embodiments described in the specification may have other technical effects and can solve other technical problems.

While only certain features and embodiments have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the disclosed subject matter. The order or sequence of any process or method steps may be varied or re-sequenced according to alternative embodiments. Furthermore, in an effort to provide a concise description of the exemplary embodiments, all features of an actual implementation may not have been described. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A battery module, comprising:
   a housing having a first end, a second end, and first and second lateral sides extending between the first and second ends;
   prismatic electrochemical cells disposed in the housing;
   a cooling duct comprising a first segment and a second segment;
   a first body of the first segment extending along the first lateral side of the housing and having a first opening to a surrounding environment, wherein the first opening of the first body is proximate to the second end of the housing;
   a second body of the second segment extending along the second lateral side of the housing and having a second opening to the surrounding environment, wherein the second opening is proximate to the second end of the housing; and
   a fan disposed on the first end of the housing, wherein the fan is fluidly coupled to the cooling duct and the fan is configured to generate an airflow through the first and second openings and along the first and second bodies.

2. The battery module of claim 1, wherein the fan is configured to draw the airflow toward the fan from the first and second openings.

3. The battery module of claim 1, wherein the fan is configured to push the airflow away from the fan toward the first and second openings.

4. The battery module of claim 1, wherein the fan is embedded in the first end of the housing.

5. The battery module of claim 1, wherein the first end of the housing comprises a passage and the fan is coupled to the passage of the first end.

6. The battery module of claim 1, wherein at least a portion of the cooling duct is integral with the housing.

7. The battery module of claim 1, wherein the first and second segments of the cooling duct are coupled to the first and second lateral sides of the housing, respectively.

8. The battery module of claim 1, wherein the cooling duct comprises an intervening segment that fluidly couples the first and second bodies proximate to the first end of the housing, and the fan is fluidly coupled to the intervening segment.

9. The battery module of claim 1, wherein the first and second bodies of the first and second segments are separately coupled to the fan and are not in fluid communication with each other except via the fan.

10. The battery module of claim 1, wherein a first cooling plate extends along the first body of the first segment and a second cooling plate extends along the second body of the second segment.

11. The battery module of claim 10, wherein the first and second cooling plates each abut the prismatic electrochemical cells.

12. The battery module of claim 10, wherein the first and second cooling plates are configured to be exposed to an airflow through the cooling duct.

13. The battery module of claim 10, wherein the first and second cooling plates comprise cooling fins that extend into the cooling duct.

14. The battery module of claim 1, wherein each prismatic electrochemical cell comprises a base end, a terminal end opposite to the base end, broad faces extending between the base end and the terminal end, and narrow faces extending between the base end, the terminal end, and the broad faces, and the prismatic electrochemical cells are disposed in the housing such that the narrow faces are proximate to the first and second lateral sides of the housing.

15. The battery module of claim 1, wherein each of the first and second bodies of the first and second segments comprises a separating wall that separates each of the first and second bodies into two separate flow paths.

16. A battery module, comprising:
   a housing comprising a first end and a second end opposite to the first end;
   prismatic electrochemical cells disposed in an inside of the housing between the first end and the second end;
   a duct comprising at least two flow paths extending along a length of the housing of the battery module between the first and second ends of the housing; and
   a fan disposed on the first end of the housing, wherein the fan is configured to draw air through the duct at least from the second end of the housing to the first end of the housing through the duct and to expel the air from the duct.

17. The battery module of claim 16, wherein the housing comprises a first lateral side extending between the first and second ends of the housing and a second lateral side disposed opposite to the first lateral side and extending between the first and second ends of the housing, wherein the at least two flow paths of the duct comprise a first segment having a first body extending along the first lateral side and having a first inlet disposed proximate to the second end of the housing, and a second segment having a second body extending along the second lateral side and having a second inlet disposed proximate to the second end of the housing, and wherein the fan is configured to draw the air through the first and second inlets and through the first and second bodies of the first and second segments, respectively.

18. The battery module of claim 16, wherein the at least two flow paths of the duct are disposed along a bottom of the housing extending between the first and second ends of the housing and along base ends of the prismatic electrochemical cells proximate to the bottom of the housing.

19. The battery module of claim 18, wherein the at least two flow paths comprise a first flow path having first and second segments and a second flow path having third and fourth segments, wherein the first and third segments extend from corresponding inlets at the first end of the housing toward the second end of the housing, wherein the second and fourth segments are fluidly coupled to the fan at the first end and extend toward the second end of the housing, wherein the first and second segments are fluidly coupled via a first turn, and wherein the third and fourth segments are fluidly coupled via a second turn.

20. The battery module of claim 16, comprising a cooling plate disposed at least partially between the duct and the prismatic electrochemical cells.

21. A battery module, comprising:
   a housing having a first end, a second end opposite to the first end, and a bottom extending between the first end and the second end;
   prismatic electrochemical cells disposed in an inside of the housing between the first end and the second end such that base ends of the prismatic electrochemical cells are proximate to the bottom of the housing;
   a fluid guide assembly extending along the bottom of the housing, wherein the fluid guide assembly comprises a first flow path having a first segment and a second segment fluidly coupled to the first segment proximate to the second end of the housing to form a U-shape, and a second flow path having a third segment and a fourth segment fluidly coupled to the third segment proximate to the second end of the housing to form a U-shape; and a fan disposed on the first end of the housing, wherein the fan is fluidly coupled to a distal end of the second segment of the first flow path and to a distal end of the fourth segment of the second flow path, and wherein the first segment of the first flow path and the third segment of the second flow path comprise inlets fluidly coupling the first and third segments of the first and second flow paths, respectively, to a surrounding environment.

22. The battery module of claim 21, wherein the first segment is fluidly coupled to the second segment via a first 180 degree turn member, and the third segment is coupled to the fourth segment via a second 180 degree turn member.

* * * * *

UNITED STATES PATENT AND TRADEMARK OFFICE
CERTIFICATE OF CORRECTION

PATENT NO.         : 9,559,393 B2
APPLICATION NO.    : 14/503101
DATED              : January 31, 2017
INVENTOR(S)        : Obasih et al.

It is certified that error appears in the above-identified patent and that said Letters Patent is hereby corrected as shown below:

In the Specification

In Column 14, Line 14, please delete "illustrated illustrated" and insert -- illustrated --.

In Column 14, Lines 38-39, please delete "lower plate 149" and insert -- lower plate 151 --.

In Column 14, Line 41, please delete "149, 151." and insert -- 151, 149. --.

In Column 14, Lines 42-43, please delete "upper plate 151" and insert -- upper plate 149 --.

In Column 15, Line 58, please delete "first segments 176" and insert -- first segments 174 --.

In Column 15, Lines 60-61, please delete "second segments 178." and insert -- second segments 176. --.

In Column 15, Line 63, please delete "first segments 176" and insert -- first segments 174 --.

In Column 17, Line 34, please delete "but not" and insert -- but not in --.

Signed and Sealed this
Twenty-eighth Day of November, 2017

Joseph Matal
*Performing the Functions and Duties of the
Under Secretary of Commerce for Intellectual Property and
Director of the United States Patent and Trademark Office*